(12) United States Patent
Tolman et al.

(10) Patent No.: US 12,344,455 B2
(45) Date of Patent: Jul. 1, 2025

(54) CONTAINER AND METHOD OF FORMING A CONTAINER

(71) Applicant: YETI Coolers, LLC, Austin, TX (US)

(72) Inventors: John Alan Tolman, Austin, TX (US); Roy Joseph Seiders, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 0 days.

(21) Appl. No.: 15/458,344

(22) Filed: Mar. 14, 2017

(65) Prior Publication Data

US 2017/0259983 A1     Sep. 14, 2017

Related U.S. Application Data

(60) Provisional application No. 62/308,046, filed on Mar. 14, 2016.

(51) Int. Cl.
*B65D 81/38*     (2006.01)
*A47G 19/22*     (2006.01)
(Continued)

(52) U.S. Cl.
CPC ..... *B65D 81/3869* (2013.01); *A47G 19/2272* (2013.01); *A47J 41/028* (2013.01);
(Continued)

(58) Field of Classification Search
CPC .... B65D 81/3869; B65D 43/02; A47J 41/028; B23K 31/02; B23K 2103/18;
(Continued)

(56) References Cited

U.S. PATENT DOCUMENTS 604,514 A     5/1898     Belden
899,290 A     9/1908     Bricker et al.
(Continued)

FOREIGN PATENT DOCUMENTS

CA     2534232 A1     2/2005
CA     2977632 A1     9/2016
(Continued)

OTHER PUBLICATIONS

Physical-Hardness | Characteristics of Fine Ceramics | Fine Ceramics World (Wayback Machine) (Year: 2009).*

(Continued)

*Primary Examiner* — Anthony D Stashick
*Assistant Examiner* — Symren K Sanghera
(74) *Attorney, Agent, or Firm* — Banner & Witcoff, Ltd.

(57) ABSTRACT

An insulating container can be configured to retain a volume of liquid, and include a first inner wall having a first end having an opening extending into an internal reservoir, and a second outer wall forming an outer shell. The second outer wall can include a second end configured to support the container on a surface. The second outer wall can include a dimple, and the dimple can include a circular base and an inner portion converging to an opening extending into the second outer wall. The opening can be sealed by a resin, and the circular base can be covered by disc formed of the material. The outer wall and the inner wall can be constructed from different materials such that the outer wall is harder and resists indentation, and the inner wall reduces the overall weight of the container.

9 Claims, 10 Drawing Sheets

(51) Int. Cl.
    *A47J 41/02*     (2006.01)
    *B23K 31/02*     (2006.01)
    *B23K 103/18*     (2006.01)
    *B29C 70/76*     (2006.01)
    *B65D 43/02*     (2006.01)
    *B29L 31/00*     (2006.01)
    *C22F 1/04*     (2006.01)
    *C22F 1/18*     (2006.01)

(52) U.S. Cl.
    CPC .......... *B23K 31/02* (2013.01); *B29C 70/766* (2013.01); *B65D 43/02* (2013.01); *B23K 2103/18* (2018.08); *B29L 2031/7132* (2013.01); *C22F 1/04* (2013.01); *C22F 1/183* (2013.01)

(58) Field of Classification Search
    CPC .......... A47G 19/2272; B29C 70/766; B29L 2031/7132; C22F 1/04; C22F 1/183
    USPC ................................................ 220/592.17
    See application file for complete search history.

(56) References Cited

U.S. PATENT DOCUMENTS

| | | |
|---|---|---|
| 1,133,420 A | 3/1915 | Young |
| 2,029,429 A | 2/1936 | Koons |
| 2,070,414 A | 2/1937 | Snell |
| 2,088,387 A | 7/1937 | Rice, Jr. et al. |
| 2,128,466 A | 8/1938 | Machotka |
| 2,215,402 A | 9/1940 | McDonald |
| 2,378,867 A | 6/1945 | Reichart |
| D157,491 S | 2/1950 | Heintze |
| 2,643,021 A | 6/1953 | Freedman |
| D177,559 S | 5/1956 | Emmert |
| 2,871,051 A | 1/1959 | Nesslein et al. |
| D186,555 S | 11/1959 | Hunt |
| 2,928,570 A | 3/1960 | Fitch |
| 2,981,562 A | 4/1961 | Long |
| 3,107,029 A | 10/1963 | Rylander |
| 3,202,309 A | 8/1965 | Simpson |
| 3,261,633 A | 7/1966 | Sakuta |
| 3,342,370 A | 9/1967 | Johnson |
| D209,308 S | 11/1967 | Schilling |
| D209,533 S | 12/1967 | Cole |
| D211,818 S | 7/1968 | Massey |
| 3,458,164 A | 7/1969 | Massey |
| D217,781 S | 6/1970 | Stone |
| 3,679,253 A | 7/1972 | Simms |
| 3,682,352 A | 8/1972 | Doucette |
| D229,006 S | 11/1973 | Sauey |
| 3,979,011 A | 9/1976 | Schleicher |
| 4,120,073 A | 10/1978 | Studebaker |
| 4,127,915 A | 12/1978 | Logan et al. |
| D251,175 S | 2/1979 | Logan et al. |
| D254,417 S | 3/1980 | DeMars et al. |
| D255,858 S | 7/1980 | Ashton |
| D256,418 S | 8/1980 | Corbett |
| D258,795 S | 4/1981 | Zamorski |
| D265,159 S | 6/1982 | La Barbera |
| D265,279 S | 7/1982 | Wright |
| D265,880 S | 8/1982 | Craig |
| 4,560,075 A | 12/1985 | Lu |
| D285,032 S | 8/1986 | Alonzo |
| D286,967 S | 12/1986 | Appel |
| D287,451 S | 12/1986 | Schrock |
| 4,654,274 A | 3/1987 | DeMars |
| D289,484 S | 4/1987 | Forquer et al. |
| D293,293 S | 12/1987 | Isles |
| 4,746,028 A | 5/1988 | Bagg |
| 4,746,032 A | 5/1988 | Huang |
| D298,200 S | 10/1988 | Block et al. |
| 4,819,829 A | 4/1989 | Rosten et al. |
| 4,848,625 A | 7/1989 | Lucia |
| 4,869,390 A | 9/1989 | Kennedy |
| D309,545 S | 7/1990 | Ancona et al. |
| 4,993,675 A | 2/1991 | Walker |
| 4,997,124 A | 3/1991 | Kitabatake et al. |
| 5,168,140 A | 12/1992 | Welker |
| 5,168,793 A | 12/1992 | Padamsee |
| D334,869 S | 4/1993 | Mills |
| 5,208,951 A | 5/1993 | Aoki |
| D337,029 S | 7/1993 | McKechnie |
| D346,092 S | 4/1994 | Van De Velde |
| D357,387 S | 4/1995 | Davidson et al. |
| 5,427,269 A | 6/1995 | Willbrandt |
| 5,433,337 A | 7/1995 | Willbrandt |
| D362,369 S | 9/1995 | Bridges |
| 5,462,189 A | 10/1995 | Pierce |
| D370,384 S | 6/1996 | Shamis |
| 5,531,353 A | 7/1996 | Ward et al. |
| D372,839 S | 8/1996 | Laib |
| D379,738 S | 6/1997 | Liming et al. |
| D382,174 S | 8/1997 | Grimm |
| 5,655,805 A | 8/1997 | Shaddy |
| D384,557 S | 10/1997 | Goza |
| 5,678,725 A | 10/1997 | Yamada et al. |
| D386,948 S | 12/1997 | Wissinger |
| D387,620 S | 12/1997 | Trombly |
| D395,200 S | 6/1998 | Bidwell |
| D395,238 S | 6/1998 | Freitas |
| D395,825 S | 7/1998 | Freitas |
| D396,381 S | 7/1998 | Chung |
| 5,788,298 A | 8/1998 | Cheng |
| 5,799,369 A | 9/1998 | Schulein |
| 5,816,631 A | 10/1998 | Kochan |
| D400,401 S | 11/1998 | Lynd |
| 5,839,599 A | 11/1998 | Lin |
| 5,848,722 A | 12/1998 | Hanes |
| D404,241 S | 1/1999 | Bagley |
| 5,868,310 A | 2/1999 | Leszczynski |
| D412,806 S | 8/1999 | Pierce |
| D416,444 S | 11/1999 | Jørgensen |
| D416,757 S | 11/1999 | Ginuntoli |
| D417,365 S | 12/1999 | Huang |
| D417,589 S | 12/1999 | Parker |
| D417,819 S | 12/1999 | Kelly-Pollet |
| D427,853 S | 7/2000 | Kohlhase |
| D428,306 S | 7/2000 | Lee |
| D429,607 S | 8/2000 | Prim |
| D429,959 S * | 8/2000 | Otake ............................ D7/533 |
| 6,102,458 A | 8/2000 | Scace |
| D432,865 S | 10/2000 | Cohen |
| 6,135,312 A | 10/2000 | Chen et al. |
| D433,876 S | 11/2000 | Freed |
| D433,877 S | 11/2000 | Bickert et al. |
| 6,149,028 A | 11/2000 | Yu |
| D436,294 S | 1/2001 | Marck |
| D436,295 S | 1/2001 | Furman et al. |
| D437,187 S | 2/2001 | Cheng |
| 6,216,909 B1 | 4/2001 | Lin |
| 6,237,801 B1 | 5/2001 | Liu |
| 6,241,415 B1 | 6/2001 | Stark |
| D444,349 S | 7/2001 | Lin |
| 6,260,732 B1 | 7/2001 | Khodush |
| D446,687 S | 8/2001 | Furman et al. |
| 6,332,557 B1 | 12/2001 | Moran |
| 6,352,235 B2 | 3/2002 | Cizek |
| 6,360,913 B1 | 3/2002 | Bruinsma et al. |
| D455,613 S | 4/2002 | Bruinsma et al. |
| D456,578 S | 4/2002 | Smith et al. |
| D457,389 S | 5/2002 | Snell |
| 6,382,449 B1 | 5/2002 | Kazmierski et al. |
| D458,081 S | 6/2002 | Bodum |
| 6,409,038 B1 | 6/2002 | Karp |
| RE37,773 E | 7/2002 | Trombley |
| D460,324 S | 7/2002 | Norris et al. |
| D460,895 S | 7/2002 | Lin |
| D462,879 S | 9/2002 | Martens |
| 6,450,363 B1 | 9/2002 | Lin |
| D463,715 S | 10/2002 | Dretzka |
| D465,132 S | 11/2002 | Janky et al. |
| D466,371 S | 12/2002 | Parker |

(56) References Cited

U.S. PATENT DOCUMENTS

| | | |
|---|---|---|
| D469,309 S | 1/2003 | Janky |
| D469,658 S | 2/2003 | Norris et al. |
| D471,763 S | 3/2003 | Hurlbut et al. |
| D472,101 S | 3/2003 | Janky |
| D472,425 S | 4/2003 | Hurlbut et al. |
| 6,557,751 B2 | 5/2003 | Puerini |
| D476,193 S | 6/2003 | Janky |
| D477,185 S | 7/2003 | Janky |
| 6,588,064 B2 | 7/2003 | Baum |
| D481,590 S | 11/2003 | Lin |
| D482,933 S | 12/2003 | Norris et al. |
| D483,165 S | 12/2003 | Dretzka |
| D483,226 S | 12/2003 | Belton et al. |
| D483,995 S | 12/2003 | Otake |
| D484,361 S | 12/2003 | Jeung |
| 6,658,701 B1 | 12/2003 | DeHart et al. |
| D486,697 S | 2/2004 | Copeland |
| D486,997 S | 2/2004 | Janky |
| D488,673 S | 4/2004 | Farce |
| D489,577 S | 5/2004 | Giampavolo |
| D490,274 S | 5/2004 | Irvine |
| 6,729,665 B1 | 5/2004 | Posey et al. |
| D493,068 S | 7/2004 | Slater et al. |
| D497,515 S | 10/2004 | Bydalek |
| D502,633 S | 3/2005 | Liu |
| 6,864,462 B2 | 3/2005 | Sanoner et al. |
| D507,458 S | 7/2005 | Allen et al. |
| 6,962,265 B1 | 11/2005 | Zhang |
| D512,269 S | 12/2005 | Trombly |
| D512,272 S | 12/2005 | Avrish |
| D512,275 S | 12/2005 | Kent-Fawkes |
| 6,979,031 B2 | 12/2005 | Coppotelli et al. |
| D523,693 S | 6/2006 | Bodum |
| D524,607 S | 7/2006 | Kent-Fawkes |
| 7,104,413 B2 * | 9/2006 | Liu .................. A47J 41/0055 215/12.1 |
| D531,454 S | 11/2006 | Zerillo et al. |
| D533,403 S | 12/2006 | Bhavnani |
| D533,748 S | 12/2006 | Bresler |
| D534,396 S | 1/2007 | Kramer |
| D537,676 S | 3/2007 | Kingsley |
| D537,677 S | 3/2007 | Bresler |
| 7,194,951 B1 | 3/2007 | Porter |
| 7,195,137 B2 | 3/2007 | Belcastro |
| D539,609 S | 4/2007 | Ying et al. |
| 7,207,538 B2 | 4/2007 | Kent-Fawkes |
| D544,302 S | 6/2007 | Gibbons |
| D545,624 S | 7/2007 | Tien |
| D546,125 S | 7/2007 | Bhavnani |
| D548,012 S | 8/2007 | Tien |
| D548,599 S | 8/2007 | Blasko |
| D550,038 S | 9/2007 | Trombly |
| D552,932 S | 10/2007 | Carlson |
| D553,440 S | 10/2007 | Bodum |
| D553,910 S | 10/2007 | Bodum |
| 7,284,777 B1 | 10/2007 | Kraemer |
| D555,430 S | 11/2007 | Tien |
| D557,567 S | 12/2007 | Gronikowski et al. |
| D558,523 S | 1/2008 | Bhavnani |
| D560,512 S | 1/2008 | Safar |
| D561,590 S | 2/2008 | Kingsley |
| D563,725 S | 3/2008 | Alviar et al. |
| D564,300 S | 3/2008 | Liu |
| D565,901 S | 4/2008 | Edelstein et al. |
| D566,471 S | 4/2008 | Bodum |
| D567,590 S | 4/2008 | Bodum |
| D568,107 S | 5/2008 | Bhavnani |
| D568,685 S | 5/2008 | Bodum |
| D569,183 S | 5/2008 | Blake |
| D569,188 S | 5/2008 | Tornqvist |
| D573,840 S | 7/2008 | Kramer |
| D577,260 S | 9/2008 | Bodum |
| D587,523 S | 3/2009 | Moon |
| D588,912 S | 3/2009 | Christensen et al. |
| 7,513,380 B2 | 4/2009 | Canedo |
| D592,015 S | 5/2009 | Carpenter |
| D592,058 S | 5/2009 | Rapaport |
| 7,527,310 B2 | 5/2009 | Shaskey, Sr. |
| D593,859 S | 6/2009 | Barnum |
| D594,699 S | 6/2009 | Spivey et al. |
| D595,133 S | 6/2009 | Lewis |
| D598,747 S | 8/2009 | Caldwell |
| D600,073 S | 9/2009 | Carreno |
| 7,581,704 B1 | 9/2009 | Pugsley |
| 7,581,770 B2 | 9/2009 | Jones |
| 7,604,270 B1 | 10/2009 | McCarthy |
| D609,054 S | 2/2010 | Gilbert |
| D609,534 S | 2/2010 | Traficante et al. |
| 7,686,183 B2 | 3/2010 | Ziegler |
| D613,554 S | 4/2010 | Koennecke |
| D615,358 S | 5/2010 | Wahl |
| D615,366 S | 5/2010 | Berezansky |
| D616,248 S | 5/2010 | George |
| D617,640 S | 6/2010 | Jones |
| D618,964 S | 7/2010 | Eisenhardt |
| D619,419 S | 7/2010 | McClellan et al. |
| D622,548 S | 8/2010 | Jensen et al. |
| D631,699 S | 2/2011 | Moreau |
| D636,640 S | 4/2011 | Latham |
| 7,950,541 B2 | 5/2011 | Holcomb et al. |
| D643,289 S | 8/2011 | Harlan |
| D648,599 S | 11/2011 | Watanabe et al. |
| D652,256 S | 1/2012 | Eyal |
| D658,922 S | 5/2012 | Fallon et al. |
| D659,474 S | 5/2012 | Wahl et al. |
| D660,082 S | 5/2012 | Wahl |
| D664,001 S | 7/2012 | Liu |
| D667,268 S | 9/2012 | Pallotto |
| D669,735 S | 10/2012 | Wong |
| D670,525 S | 11/2012 | Fallon et al. |
| D675,063 S | 1/2013 | Wahl |
| 8,364,542 B2 | 1/2013 | Grauel et al. |
| D680,378 S | 4/2013 | Romley |
| 8,484,809 B2 | 7/2013 | Fiedler |
| 8,495,803 B2 | 7/2013 | Fiedler |
| 8,499,951 B1 | 8/2013 | McDonald et al. |
| D693,176 S | 11/2013 | Kaiser |
| D693,649 S | 11/2013 | Yeung |
| 8,608,019 B2 | 12/2013 | Wren |
| D698,200 S | 1/2014 | Lauwagie |
| 8,636,167 B2 | 1/2014 | Hajichristou et al. |
| 8,684,430 B1 | 4/2014 | Brandon |
| D705,012 S | 5/2014 | Lapsker |
| D709,328 S | 7/2014 | Ross |
| D709,737 S | 7/2014 | Weinert et al. |
| D709,738 S | 7/2014 | Weinert et al. |
| D712,701 S | 9/2014 | Boroski |
| D713,686 S | 9/2014 | Eyal |
| D717,605 S | 11/2014 | Kristinik |
| D717,606 S | 11/2014 | Kristinik |
| D719,408 S | 12/2014 | Weber |
| D720,183 S | 12/2014 | Chiang |
| D720,187 S | 12/2014 | Romley |
| 8,899,644 B2 | 12/2014 | Hancey |
| 8,919,603 B2 | 12/2014 | Greene |
| D728,311 S | 5/2015 | Eyal |
| D728,313 S | 5/2015 | Bo |
| D729,581 S | 5/2015 | Boroski |
| 9,021,662 B1 | 5/2015 | Jones |
| 9,038,850 B1 | 5/2015 | Wilson |
| D730,696 S | 6/2015 | Nemeth et al. |
| D731,251 S | 6/2015 | Lane |
| D732,338 S | 6/2015 | Boroski |
| D732,343 S | 6/2015 | Romley |
| D732,895 S | 6/2015 | McClellan |
| D734,096 S | 7/2015 | George et al. |
| 9,096,148 B2 | 8/2015 | Fiedler |
| D740,073 S | 10/2015 | Zorovich et al. |
| D740,077 S | 10/2015 | Strepkoff |
| D740,618 S | 10/2015 | Knoll |
| D743,209 S | 11/2015 | Maas et al. |
| D744,286 S | 12/2015 | Morris, II et al. |
| D745,324 S | 12/2015 | Malaspino |
| D751,338 S | 3/2016 | Seiders et al. |

(56) References Cited

U.S. PATENT DOCUMENTS

| | | |
|---|---|---|
| D751,339 S | 3/2016 | Seiders et al. |
| D751,340 S | 3/2016 | Seiders et al. |
| D751,341 S | 3/2016 | Seiders et al. |
| D761,619 S | 7/2016 | Seiders et al. |
| D761,625 S | 7/2016 | Engler et al. |
| D776,980 S | 1/2017 | Thun et al. |
| D791,543 S | 7/2017 | Mulhauser et al. |
| D796,902 S | 9/2017 | Gordon |
| D797,510 S | 9/2017 | Ke |
| 9,757,536 B2 * | 9/2017 | Abt .................. B29C 66/02241 |
| 9,758,290 B2 * | 9/2017 | Huang ............... B65D 81/2015 |
| 9,782,029 B1 | 10/2017 | FitzSimons |
| D801,746 S | 11/2017 | Thuma et al. |
| D802,362 S | 11/2017 | Spivey et al. |
| 9,815,076 B2 | 11/2017 | Schulz et al. |
| 9,845,181 B2 | 12/2017 | Abraham |
| D808,218 S | 1/2018 | Seiders et al. |
| D808,722 S | 1/2018 | Hill |
| D808,733 S | 1/2018 | Spivey et al. |
| D810,511 S | 2/2018 | Harrington, III et al. |
| 9,889,968 B2 | 2/2018 | Morewitz et al. |
| D811,817 S | 3/2018 | Harrington, III et al. |
| D812,979 S | 3/2018 | Seiders et al. |
| D813,605 S | 3/2018 | Seiders et al. |
| D814,240 S | 4/2018 | Kabalin |
| D814,242 S | 4/2018 | Seiders et al. |
| D814,243 S | 4/2018 | Pape |
| D814,870 S | 4/2018 | Spivey et al. |
| D815,893 S | 4/2018 | Seiders et al. |
| D817,101 S | 5/2018 | Kestenbaum et al. |
| D819,406 S | 6/2018 | Rivera |
| D820,045 S | 6/2018 | Harrington, III et al. |
| D821,151 S | 6/2018 | Lapsker |
| D822,440 S | 7/2018 | Kuh et al. |
| 10,026,535 B2 | 7/2018 | Bohannon |
| D825,993 S | 8/2018 | Sadhwani |
| D827,378 S | 9/2018 | Mulhauser et al. |
| D828,724 S | 9/2018 | Wall |
| D830,127 S | 10/2018 | Rohe |
| D830,770 S | 10/2018 | Verhoeven |
| D831,427 S | 10/2018 | Thompson |
| D833,227 S | 11/2018 | Kehrein |
| D833,817 S | 11/2018 | Sletten |
| D837,601 S | 1/2019 | Silsby |
| D842,028 S | 3/2019 | Melanson et al. |
| 10,232,992 B2 | 3/2019 | Seiders et al. |
| 10,232,993 B2 | 3/2019 | Seiders et al. |
| D850,191 S | 6/2019 | Jacobsen |
| D850,192 S | 6/2019 | Jacobsen |
| 10,329,070 B2 | 6/2019 | Wengerd |
| D867,057 S | 11/2019 | Spivey et al. |
| 10,486,868 B2 | 11/2019 | Spivey et al. |
| D871,149 S | 12/2019 | Kaiser |
| D872,537 S | 1/2020 | Guccione |
| D873,610 S | 1/2020 | Stanton |
| D873,611 S | 1/2020 | Stanton |
| D875,471 S | 2/2020 | Cheng et al. |
| D880,256 S | 4/2020 | Silsby |
| D882,343 S | 4/2020 | Rane et al. |
| D886,526 S | 6/2020 | Seiders et al. |
| 10,676,251 B2 | 6/2020 | Krafft |
| 10,687,644 B1 | 6/2020 | Moore et al. |
| 10,689,166 B1 | 6/2020 | Cheng |
| D890,573 S | 7/2020 | Jacobsen |
| D891,182 S | 7/2020 | Lane et al. |
| D895,370 S | 9/2020 | Hamilton |
| D896,589 S | 9/2020 | Smith |
| D899,190 S | 10/2020 | Jacobsen |
| D899,191 S | 10/2020 | Jacobsen |
| D899,192 S | 10/2020 | Yu |
| D899,857 S | 10/2020 | Jacobsen |
| D899,858 S | 10/2020 | Jacobsen |
| D899,862 S | 10/2020 | Rane et al. |
| 10,791,858 B2 | 10/2020 | Robertson |
| D904,125 S | 12/2020 | Jacobsen |
| 10,870,522 B2 | 12/2020 | Lane |
| D909,818 S | 2/2021 | Hunter et al. |
| D911,779 S | 3/2021 | Hunter et al. |
| D915,827 S | 4/2021 | Fang |
| 10,968,029 B1 * | 4/2021 | Rane .................... B65D 81/383 |
| D917,970 S | 5/2021 | Bullock et al. |
| D918,658 S | 5/2021 | Bullock et al. |
| D934,633 S | 11/2021 | Hunter et al. |
| D935,278 S | 11/2021 | Hunter et al. |
| D939,278 S | 12/2021 | Vierck |
| D943,354 S | 2/2022 | Powell et al. |
| D944,600 S | 3/2022 | Pisarevsky |
| D947,613 S | 4/2022 | Wahl |
| D955,173 S | 6/2022 | Smith et al. |
| D958,602 S | 7/2022 | Jacob |
| D960,645 S | 8/2022 | Ji |
| D960,647 S | 8/2022 | Yang |
| D963,410 S | 9/2022 | Giles |
| D964,102 S | 9/2022 | Jinkins et al. |
| 11,447,309 B2 | 9/2022 | Jinkins et al. |
| D977,912 S | 2/2023 | Jinkins et al. |
| D979,340 S | 2/2023 | Hunter et al. |
| D982,973 S | 4/2023 | Jinkins et al. |
| D982,982 S | 4/2023 | Jinkins et al. |
| D996,909 S | 8/2023 | Kuh et al. |
| 11,718,455 B2 | 8/2023 | Jinkins et al. |
| D1,000,208 S | 10/2023 | Lv |
| 11,786,076 B2 | 10/2023 | Tolman et al. |
| D1,003,662 S | 11/2023 | Chiu |
| 2002/0066758 A1 | 6/2002 | Fadal et al. |
| 2004/0040962 A1 | 3/2004 | Bielecki et al. |
| 2004/0149763 A1 | 8/2004 | Chen |
| 2004/0187265 A1 | 9/2004 | Ho |
| 2005/0045643 A1 | 3/2005 | Ghanem |
| 2005/0098565 A1 | 5/2005 | Liu |
| 2005/0211712 A1 * | 9/2005 | Moran ................ B65D 85/307 |
| | | 220/592.25 |
| 2005/0218109 A1 | 10/2005 | Semersky et al. |
| 2006/0175506 A1 | 8/2006 | Lan |
| 2007/0295738 A1 | 12/2007 | Hussain |
| 2008/0012368 A1 | 1/2008 | Kent-Fawkes |
| 2008/0023434 A1 | 1/2008 | Takayama |
| 2008/0101056 A1 | 5/2008 | Bhavnani |
| 2009/0008399 A1 | 1/2009 | Mayled et al. |
| 2009/0065469 A1 | 3/2009 | McClellan et al. |
| 2010/0206874 A1 | 8/2010 | Masurier et al. |
| 2011/0204017 A1 | 8/2011 | O'Sullivan |
| 2012/0074155 A1 | 3/2012 | Yeung |
| 2012/0091131 A1 * | 4/2012 | Arjomand ................ B65D 7/22 |
| | | 220/4.01 |
| 2012/0261408 A1 | 10/2012 | White |
| 2013/0098932 A1 | 4/2013 | Hunt |
| 2013/0186849 A1 | 7/2013 | Iwashita |
| 2013/0327738 A1 * | 12/2013 | Harrison ................ B65D 15/14 |
| | | 215/44 |
| 2014/0034080 A1 | 2/2014 | Paquet et al. |
| 2014/0186507 A1 | 7/2014 | Wales |
| 2015/0041480 A1 | 2/2015 | Ramsey |
| 2015/0102032 A1 | 4/2015 | Dunn et al. |
| 2015/0108150 A1 | 4/2015 | Garcia |
| 2015/0108152 A1 | 4/2015 | Franzen et al. |
| 2015/0122828 A1 | 5/2015 | Madala |
| 2015/0164256 A1 | 6/2015 | Helton |
| 2015/0191293 A1 | 7/2015 | Forcella |
| 2015/0197390 A1 * | 7/2015 | Kurabe ................ A47J 41/0077 |
| | | 220/592.27 |
| 2015/0232232 A1 * | 8/2015 | Shibuki ............ B65D 81/3841 |
| | | 220/592.16 |
| 2015/0291316 A1 | 10/2015 | Fietz |
| 2015/0329250 A1 | 11/2015 | Barreto et al. |
| 2016/0272384 A1 | 9/2016 | Lee et al. |
| 2016/0318692 A1 | 11/2016 | Wilson |
| 2017/0042355 A1 * | 2/2017 | Bolland .............. A47G 19/2205 |
| 2017/0066573 A1 | 3/2017 | Karussi et al. |
| 2017/0095120 A1 * | 4/2017 | Tolman .................. B65D 85/72 |
| 2017/0119212 A1 * | 5/2017 | Petrillo ............... A47J 41/0072 |
| 2017/0121072 A1 | 5/2017 | Seiders et al. |
| 2017/0121074 A1 | 5/2017 | Seiders et al. |
| 2017/0225855 A1 | 8/2017 | Lawson et al. |

(56) References Cited

U.S. PATENT DOCUMENTS

| | | | |
|---|---|---|---|
| 2017/0259983 A1* | 9/2017 | Tolman | B23K 31/02 |
| 2017/0273484 A1 | 9/2017 | Spivey et al. | |
| 2017/0362012 A1* | 12/2017 | Choltco-Devlin | |
| | | | B65D 39/0005 |
| 2018/0009576 A1* | 1/2018 | Sullivan | B65D 47/0895 |
| 2018/0105346 A1* | 4/2018 | Tolman | A47J 41/0027 |
| 2018/0127165 A1 | 5/2018 | Smaldone et al. | |
| 2018/0140120 A1 | 5/2018 | Shackelford | |
| 2018/0289186 A1 | 10/2018 | Heiberger | |
| 2019/0047773 A1* | 2/2019 | Bullock | B65D 41/0414 |
| 2019/0069699 A1* | 3/2019 | Nichols | A47G 19/2288 |
| 2019/0092540 A1 | 3/2019 | Spivey et al. | |
| 2019/0125111 A1 | 5/2019 | Morewitz et al. | |
| 2019/0152661 A1 | 5/2019 | Seiders et al. | |
| 2019/0216243 A1 | 7/2019 | Honig | |
| 2019/0216245 A1* | 7/2019 | Choi | A47G 23/0216 |
| 2019/0331390 A1* | 10/2019 | Chen | A47J 41/022 |
| 2020/0055645 A1 | 2/2020 | Lane | |
| 2020/0231345 A1 | 7/2020 | Lane et al. | |
| 2020/0331671 A1 | 10/2020 | Seiders et al. | |
| 2020/0361672 A1 | 11/2020 | Jinkins et al. | |
| 2020/0377272 A1 | 12/2020 | Ma et al. | |
| 2020/0377273 A1 | 12/2020 | Seiders et al. | |
| 2020/0391910 A1 | 12/2020 | Pinelli et al. | |
| 2021/0047089 A1 | 2/2021 | Seiders et al. | |
| 2022/0033139 A1 | 2/2022 | Buhler et al. | |
| 2022/0039574 A1* | 2/2022 | Yang | A47G 19/2205 |
| 2022/0063893 A1 | 3/2022 | Harvey | |
| 2022/0087454 A1 | 3/2022 | Meyers et al. | |
| 2022/0097916 A1* | 3/2022 | Smith | A45F 3/16 |
| 2022/0133068 A1* | 5/2022 | Sherburne | A47J 41/022 |
| | | | 426/2 |
| 2022/0151410 A1 | 5/2022 | Trammell | |

FOREIGN PATENT DOCUMENTS

| | | |
|---|---|---|
| CA | 3124054 A1 | 5/2017 |
| CA | 3122967 A1 | 4/2020 |
| CA | 194303 | 3/2022 |
| CH | 561528 A5 | 5/1975 |
| CN | 2345468 Y | 10/1999 |
| CN | 3231970 | 4/2002 |
| CN | 3257925 | 10/2002 |
| CN | 3420755 | 1/2005 |
| CN | 3436801 | 4/2005 |
| CN | 3477483 | 9/2005 |
| CN | 3511916 | 3/2006 |
| CN | 3511920 | 3/2006 |
| CN | 3513127 | 3/2006 |
| CN | 300794415 | 6/2008 |
| CN | 300959563 | 7/2009 |
| CN | 300959565 | 7/2009 |
| CN | 300973246 | 8/2009 |
| CN | 301002085 | 9/2009 |
| CN | 301383561 S | 11/2010 |
| CN | 301773778 S | 12/2011 |
| CN | 301773782 S | 12/2011 |
| CN | 301773829 S | 12/2011 |
| CN | 302228770 | 12/2012 |
| CN | 302251194 | 12/2012 |
| CN | 302264331 S | 1/2013 |
| CN | 103479240 A | 1/2014 |
| CN | 201330396737.6 | 3/2014 |
| CN | 302854397 S | 6/2014 |
| CN | 302892948 S | 7/2014 |
| CN | 201330642776.X | 10/2014 |
| CN | 104136361 A | 11/2014 |
| CN | 303105554 S | 2/2015 |
| CN | 303223158 | 5/2015 |
| CN | 303237155 | 6/2015 |
| CN | 303304733 | 7/2015 |
| CN | 303392796 S | 9/2015 |
| CN | 303487928 S | 12/2015 |
| CN | 303517059 S | 12/2015 |
| CN | 303681617 S | 5/2016 |
| CN | 303734998 S | 7/2016 |
| CN | 105899441 A | 8/2016 |
| CN | 105916411 A | 8/2016 |
| CN | 303812957 S | 8/2016 |
| CN | 303822763 S | 8/2016 |
| CN | 303956326 S | 12/2016 |
| CN | 303965197 S | 12/2016 |
| CN | 303993617 S | 1/2017 |
| CN | 304115785 S | 4/2017 |
| CN | 304121334 S | 5/2017 |
| CN | 206342283 U | 7/2017 |
| CN | 304215274 S | 7/2017 |
| CN | 304230969 S | 8/2017 |
| CN | 304398182 S | 12/2017 |
| CN | 304551884 S | 3/2018 |
| CN | 207306510 U | 5/2018 |
| CN | 207383540 U | 5/2018 |
| CN | 304655003 | 6/2018 |
| CN | 108471891 A | 8/2018 |
| CN | 108471910 A | 8/2018 |
| CN | 207886064 U | 9/2018 |
| CN | 304954466 S | 12/2018 |
| CN | 208808068 U | 5/2019 |
| CN | 208851116 U | 5/2019 |
| CN | 305169875 | 5/2019 |
| CN | 305169876 | 5/2019 |
| CN | 306050638 U | 5/2019 |
| CN | 209058675 U | 7/2019 |
| CN | 306008756 U | 7/2019 |
| CN | 305416283 S | 11/2019 |
| CN | 305476920 | 12/2019 |
| CN | 305502324 S | 12/2019 |
| CN | 305628850 | 2/2020 |
| CN | 305648489 | 3/2020 |
| CN | 305658999 | 3/2020 |
| CN | 210300507 U | 4/2020 |
| CN | 305676247 | 4/2020 |
| CN | 305740106 | 4/2020 |
| CN | 111109981 A | 5/2020 |
| CN | 305962065 S | 8/2020 |
| CN | 305978193 S | 8/2020 |
| CN | 305993997 S | 8/2020 |
| CN | 306016664 S | 8/2020 |
| CN | 306016768 S | 8/2020 |
| CN | 306031191 S | 9/2020 |
| CN | 211748590 U | 10/2020 |
| CN | 306090110 | 10/2020 |
| CN | 306090181 S | 10/2020 |
| CN | 212015230 U | 11/2020 |
| CN | 306186561 S | 11/2020 |
| CN | 306186641 S | 11/2020 |
| CN | 306186797 S | 11/2020 |
| CN | 306186841 S | 11/2020 |
| CN | 306214126 | 12/2020 |
| CN | 306214271 S | 12/2020 |
| CN | 306259892 S | 1/2021 |
| CN | 212489438 U | 2/2021 |
| CN | 212574644 U | 2/2021 |
| CN | 112450686 A | 3/2021 |
| CN | 306378710 S | 3/2021 |
| CN | 306378744 S | 3/2021 |
| CN | 212912633 U | 4/2021 |
| CN | 306448224 S | 4/2021 |
| CN | 306457158 S | 4/2021 |
| CN | 306474585 S | 4/2021 |
| CN | 306365991 S | 10/2022 |
| DE | 49902216-0002 S | 9/1999 |
| DE | 102013000557 A1 | 7/2014 |
| DE | 4020161011770008 S | 11/2016 |
| DK | DA2007002830001 S | 6/2008 |
| DM | 094255-0001 | 1/2017 |
| EM | 000365952-0002 | 7/2005 |
| EM | 000976196-0003 | 7/2008 |
| EM | 001077283-0001 | 1/2009 |
| EM | 003007087-0004 | 5/2016 |
| EM | 006147641-0006 | 2/2019 |
| EM | 006147641-0007 | 3/2019 |
| EM | 006156113-0001 | 4/2019 |

(56) References Cited

FOREIGN PATENT DOCUMENTS

| | | |
|---|---|---|
| EM | 006156113-0002 | 4/2019 |
| EM | 006156113-0003 | 4/2019 |
| EM | 006156113-0004 | 4/2019 |
| EM | 006156113-0005 | 4/2019 |
| EM | 006156113-0006 | 4/2019 |
| EM | 0064084640001 | 5/2019 |
| EM | 007773791-0001 | 4/2020 |
| EM | 008177422-0001 | 9/2020 |
| EM | 006354742-0002 | 10/2020 |
| EM | 008317929-0001 | 12/2020 |
| EM | 008317929-0002 | 12/2020 |
| EM | 008317929-0003 | 12/2020 |
| EM | 008317929-0004 | 12/2020 |
| EM | 008317929-0005 | 12/2020 |
| EM | 008317929-0006 | 12/2020 |
| EM | 007787692-0001 | 1/2021 |
| EM | 008484638-0001 | 11/2021 |
| EP | 0717949 A | 5/1984 |
| EP | 3367850 A1 | 9/2018 |
| EP | 3537936 A1 | 9/2019 |
| GB | 2354579 A | 3/2001 |
| GB | 6041423 | 8/2018 |
| GB | 6109996 | 12/2020 |
| GB | 6109997 | 12/2020 |
| GB | 6109998 | 12/2020 |
| GB | 6109999 | 12/2020 |
| GB | 6110000 | 12/2020 |
| GB | 6110001 | 12/2020 |
| GB | 9008317929-0001 | 12/2020 |
| GB | 9008317929-0002 | 12/2020 |
| GB | 9008317929-0003 | 12/2020 |
| GB | 9008317929-0004 | 12/2020 |
| GB | 9008317929-0005 | 12/2020 |
| GB | 9008317929-0006 | 12/2020 |
| IL | 25732 A | 1/1998 |
| IN | 280990-0001 | 3/2017 |
| IN | 314458-001-0001 | 11/2019 |
| IN | 314443-001-0001 | 12/2020 |
| IN | 314442-001-0001 | 3/2022 |
| JP | H07313383 A | 12/1995 |
| JP | H11164784 A | 6/1999 |
| JP | H11221667 A | 8/1999 |
| JP | 2011219125 A * | 11/2011 |
| JP | 2011219126 A | 11/2011 |
| JP | 2017124307 A | 7/2017 |
| JP | D1634137 | 6/2019 |
| JP | D1675520 | 1/2021 |
| JP | 1680040 S | 3/2021 |
| JP | D1680040 | 3/2021 |
| KR | 1020110105133 A | 9/2011 |
| KR | 300779301 | 1/2015 |
| KR | 300793118 S | 4/2015 |
| KR | 300840850 S | 2/2016 |
| KR | 300884682.0000 | 12/2016 |
| KR | 300953895.0000 | 4/2018 |
| KR | 20190001250 A | 1/2019 |
| KR | 3020190001250 | 1/2019 |
| KR | 301042715.0000 | 1/2020 |
| KR | 301045998 | 2/2020 |
| KR | 301045998.0000 | 2/2020 |
| KR | 301045998.00000 | 2/2020 |
| KR | 3010460890002 | 2/2020 |
| KR | 301058038 | 5/2020 |
| KR | 301077462.0000 | 10/2020 |
| KR | 301077816.0000 | 10/2020 |
| KR | 3010887860001 | 12/2020 |
| KR | 3010887860002 | 12/2020 |
| KR | 3010887860003 | 12/2020 |
| KR | 301100973.0000 | 3/2021 |
| RU | 00119715 U1 | 5/2020 |
| TW | 320409 S | 11/1997 |
| WO | 048079 S | 1/1999 |
| WO | 0162614 A1 | 8/2001 |
| WO | 2006048119 A1 | 5/2006 |
| WO | 2011022857 A2 | 3/2011 |
| WO | 2012064184 A1 | 5/2012 |
| WO | 2013163725 A1 | 11/2013 |
| WO | 14040211 A1 | 3/2014 |
| WO | 16204623 A1 | 12/2016 |
| WO | 2017075482 A1 | 5/2017 |
| WO | 2018089525 A1 | 5/2018 |
| WO | 202047730 A1 | 3/2020 |
| WO | 202086567 A1 | 4/2020 |
| WO | 210643564 U | 6/2020 |
| WO | D220900-001 | 3/2023 |

OTHER PUBLICATIONS

AmBrSoft materials density table (Year: 2014).*
Zahner Metal Hardness Chart (Year: 2019).*
United States District Court Western District of Texas Austin Division, "Complaint," *Yeti Coolers, LLC* v. *Sic Products LLC, d/b/a Sic Cups, d/b/a Sic*, Case: 1:16-cv-00117-RP, Document #1, Feb. 4, 2016, 23 pages.
United States District Court Western District of Texas Austin Division, "Yeti Coolers, LLC's Answer to Sic Products, LLC Counterclaims," *Yeti Coolers, LLC* v. *Sic Products LLC, d/b/a Sic Cups, d/b/a Sic*, Case: 1:16-cv-00117-RP, Document #21, Sep. 29, 2016, 15 pages.
United States District Court Western District of Texas Austin Division, "Yeti Coolers, LLC's Answer to Sic Products, LLC Counterclaims to Yeti Coolers, LLC's Amended Complaint," *Yeti Coolers, LLC* v. *Sic Products LLC, d/b/a Sic Cups, d/b/a Sic*, Case: 1:16-cv-00117-RP, Document #38, Dec. 19, 2016, 20 pages.
United States District Court Western District of Texas Austin Division, "Complaint," *Yeti Coolers, LLC* v. *The Allen Company, d/b/a Allen Color Craft*, Case: 1:15-cv-00888-RP, Document #1, Oct. 6, 2015, 24 pages.
United States District Court Western District of Texas Austin Division, "Complaint," *Yeti Coolers, LLC* v. *Titan Custom Products, Inc.*, Case: 1:15-cv-00775, Document #1, Sep. 2, 2015, 22 pages.
United States District Court Western District of Texas Austin Division, "Answer," *Yeti Coolers, LLC* v. *Tree Leaf Marketing, LLC d/b/a Big Frig*, Case: 1:16-cv-00699-RP, Document #11, Oct. 21, 2016, 8 pages.
United States District Court Western District of Texas Austin Division, "Complaint," *Yeti Coolers, LLC* v. *Tree Leaf Marketing, LLC d/b/a Big Frig*, Case: 1:16-cv-00699, Document #1, Jun. 17, 2016, 33 pages.
United States District Court Western District of Texas Austin Division, "Complaint," *Yeti Coolers, LLC* v. *US Imprints, LLC, d/b/a GOimprints*, Case: 1:15-cv-00773, Document #1, Sep. 2, 2015, 22 pages.
United States District Court Western District of Texas Austin Division, "Order," *Yeti Coolers, LLC* v. *US Imprints, LLC, d/b/a GOimprints*, Case: 1:15-cv-00773-RP, Document #23, Apr. 25, 2016, 1 page.
United States District Court Western District of Texas Austin Division, "Veterinary Internet Company, LLC d/b/a VetInternetCo's Answer to Plaintiff's Complaint," *Yeti Coolers, LLC* v. *Polar Pad LLC, d/b/a Polar Drifter, d/b/a Polar Pad, and Veterinary Internet Company, LLC, d/b/a VetInternetCo*, Case: 1:16-cv-00677-RP, Document #11, Aug. 19, 2016, 12 pages.
United States District Court Western District of Texas Austin Division, "Complaint," *Yeti Coolers, LLC* v. *Polar Pad LLC, d/b/a Polar Pad Drifter, d/b/a Polar Pad, and Veterinary Internet Company, LLC, d/b/a VetInternetCo*, Case: 1:16-cv-00128, Document #1, Feb. 12, 2016, 24 pages.
United States District Court Western District of Texas Austin Division, "Complaint," *Yeti Coolers, LLC* v. *Polar Pad LLC, d/b/a Polar Pad Drifter, d/b/a Polar Pad, and Veterinary Internet Company, LLC, d/b/a VetInternetCo*, Case: 1:16-cv-00677, Document #1, Jun. 10, 2016, 25 pages.
United States District Court Western District of Texas Austin Division, "Order," *Yeti Coolers, LLC* v. *Polar Pad LLC, d/b/a Polar Pad Drifter, d/b/a Polar Pad, and Veterinary Internet Company, LLC, d/b/a VetInternetCo*, Case: 1:16-cv-00128-RP, Document #17, Jun. 17, 2016, 1 page.

(56) References Cited

OTHER PUBLICATIONS

United States District Court Western District of Texas Austin Division, "[Proposed] Order Granting Stipulated Motion to Dismiss Defendant Polar Pad, LLC, Without Prejudice, Pursuant to Fed. R. Civ. P. 21," *Yeti Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00677-RP, Document #14, Sep. 15, 2016, 1 page.
United States District Court Western District of Texas Austin Division, "Complaint," *Yeti Coolers, LLC v. Vickery Products, LLC d/b/a Axis Cups, f/d/b/a Frio Cups*, Case: 1:17-cv-00260, Document #1, Mar. 24, 2017, 52 pages.
United States District Court Western District of Texas Austin Division, "First Amended Complaint," *Yeti Coolers, LLC v. Wal-Mart Stores, Inc. and Olympia Tools International, Inc.*, Case: 1:16-cv-00454-RP, Document #17, May 24, 2016, 26 pages.
United States District Court Western District of Texas Austin Division, "Complaint," *Yeti Coolers, LLC v. Wal-Mart Stores, Inc.*, Case: 1:16-cv-00454, Document #1, Apr. 8, 2016, 29 pages.
United States District Court Western District of Texas Austin Division, "Olympia Tools International, Inc.'s Answer to Yeti Coolers, LLC's First Amended Complaint," *Yeti Coolers, LLC v. Wal-Mart Stores, Inc. and Olympia Tools International, Inc.*, Case: 1:16-cv-00454-RP, Document #28, Jul. 14, 2016, 12 pages.
United States District Court Western District of Texas Austin Division, "Wal-Mart Stores, Inc.'s Answer to First Amended Complaint," *Yeti Coolers, LLC v. Wal-Mart Stores, Inc. and Olympia Tools International, Inc.*, Case: 1:16-cv-00454-RP, Document #22, Jun. 7, 2016, 13 pages.
United States District Court Western District of Texas Austin Division, "Plaintiffs' Complaint for Damages and Injunctive Relief," *Yeti Coolers, LLC v. Houssam Rabi d/b/a Hoo-Sizzy*, Case 1:17-cv-00418, Document 1, filed May 5, 2017, 84 pages.
United States District Court Western District of Texas Austin Division, "Plaintiffs' Complaint for Damages and Injunctive Relief," *Yeti Coolers, LLC v. Seth Stevens d/b/a SDS Marketing d/b/a Eskimo Coolers, Panther Group LLC d/b/a Eskimo Coolers, Panther Group Sales, LLC d/b/a Eskimo Coolers, and Silver Fox Sales, LLC*, Case 1:17-cv-00423, Document 1, filed May 5, 2017, 283 pages.
United States District Court Western District of Texas Austin Division, "Complaint" *Yeti Coolers, LLC v. Zhejiang Zhuosheng Industry & Trade Co, Ltd., d/b/a Wuyi Zhuosheng Household Metal Products Co., Ltd., d/b/a Yongkang Zhuosheng Metal Products Products Co., Ltd., d/b/a Zhejiang Zhuosheng Industry & Trade Co, Ltd.*, Case 1:17-cv-00821, Document 1, filed Aug. 23, 2017, 27 pages.
United States District Court Western District of Texas Austin Division, "Complaint," *Yeti Coolers, LLC v. 99 Cents Only Stores, LLC and 99 Cents Only Stores Texas, Inc.*, Case: 1:18-cv-00799, Document #1, filed Sep. 18, 2018, 102 pages.
United States District Court Western District of Texas Austin Division, "Complaint," *Yeti Coolers, LLC v. Ad-N-Art Inc. (CA) d/b/a Asobu, and Ad-N-Art Inc. (US) d/b/a Asobu*, Case: 1:18-cv-00514, Document #1, filed Jun. 20, 2018, 26 pages.
United States District Court Western District of Texas Austin Division, "Complaint," *Yeti Coolers, LLC v. Hogg Outfitters, LLC*, Case: 1:18-cv-00512, Document #1, filed Jun. 20, 2018, 26 pages.
United States District Court Western District of Texas Austin Division, "Complaint," *Yeti Coolers, LLC v. Elighters Management, Inc. d/b/a Visol Products d/b/a Visol d/b/a eflasks.com*, Case: 1:18-cv-00513, Document #1, filed Jun. 20, 2018, 25 pages.
Green Steel 20oz Beast Tumbler [online], [retrieved Jul. 26, 2018], Retrieved from the Internet, URL: <https://www.amazon.com/dp/B074L7M8DT/ref=twster_B01DQNHFCS?_encoding=UTF8&th=1>; 9 sheets, published Apr. 2, 2016.
Green Steel 30oz Beast Tumbler [online], [retrieved Jul. 26, 2018], Retrieved from the Internet, URL: https://www.amazon.com/gp/product/b01n2iyxtg <https://www.amazon.com/gp/product/bOIn2iyxtg>; 9 sheets, published date unknown, but for purposes of patent prosecution presumably more than a year prior to the filing date of the present application.
Pictures of Great American Products Tumbler, published date unknown, but prior to the filing date of the present application.
Photographic image of Yeti 30oz Rambler Tumbler, published date unknown, but prior to the filing date of the present application.
Second photographic image of Yeti 30oz Rambler Tumbler, published date unknown, but prior to the filing date of the present application.
Promotional Items, Inc., "Stainless Steel 14oz. Deluxe Coffee Insulated Tumbler Lid", retrieved from <http://www.promotional-items-inc.com/catalog/stainless_steel_18oz_commuter_coffee_mug_lid.html> on Aug. 27, 2015.
The Product Farm, "BeerNStein Rocks Tumbler Lid—Blue", retrieved from<http://store.theproductfarm.com/beernstein-rocks-tumbler-lid-blue/> on Aug. 27, 2015.
Hit Promotional Products, "24 Oz. Biggie Tumbler with Lid", retrieved from <http://www.hitpromo.net/product/show/5853/24-oz-biggie-tumbler-with-lid> on Aug. 27, 2015.
The Alexon Group, "16 Oz. Stainless Steel Travel Mug with Slide Action Lid and Plastic Inner Liner", retrieved from <https://alexongroup.com/16-oz-stainless-steel-travel-mug-with-slide-action-lid-and-plastic-inner-liner> on Aug. 27, 2015.
"New 16oz Insulated Coffee Travel Mug Stainless Steel Double Wall Thermos Tumbler", retrieved from <http://www.ebay.com/itm/New-16oz-Insulated-COFFEE-TRAVEL-MUG-Stainless-Steel-Double-Wall-Thermos-Tumbler-/171416296921> on Aug. 27, 2015.
"Stainless Steel Travel Mug with Slide Action Lid and Plastic Inner Liner—16oz.", retrieved from <http://waterbottles.com/stainless-steel-travel-mug-with-slide-action-lid-and-plastic-inner-liner-16-oz> on Aug. 27, 2015.
Vat19, "16 oz. Dual Auto/USB Heated Mug", retrieved from <https://www.vat19.com/item/16-oz-dual-auto-usb-heater-coffee-mug> on Aug. 27, 2015.
Timolino, "Signature Thermal Travel Mug Slide-Tab Lid", retrieved from <http://timolino.com/products/signature-thermal-travel-mug-slide-tab-lid> on Aug. 27, 2015.
Eshine Industrial & Maoyuan International, "400ml Double Wall Stainless Steel Travel Mug with Sliding Drink Lid", retrieved from <http://www.chinawaterbottle.com/product/400ml-double-wall-stainless-steel-travel-mug-with-sliding-drink-lid-77-520.html> on Aug. 27, 2015.
Photo USA Electronic Graphic Inc., "17fl oz Personalised Travel Mug (Plastic Insert and Metal Shell, Reverse Screw)", retrieved from <http://www.meikeda.com/stainless-steel-mug/item/15-oz-personalised-travel-mug.html> on Aug. 27, 2015.
Promo Industrial Co., Limited, "16 Oz. Blue Bullet Travel Mug W/ Handle", retrieved from <http://www.oempromo.com/Bottle-cup-and-mug/Mugs/index_73.htm> on Aug. 27, 2015.
Gold Bond Inc., "16Ct—16 oz Cafe Tumbler", retrieved from <http://www.goldbondinc.com/16ct> on Aug. 27, 2015.
"Yeti Rambler 20 and 30 oz", published on Apr. 19, 2014, retrieved from https://web.archive.org/web/20140419041951/http://yeticoolers.com/rambler-tumblers/ on Sep. 2, 2015.
Photographic image of Yeti 20oz Rambler Tumbler, published date unknown, but prior to the filing date of the present application.
Alexander, Emmet, "Removable Bicycle Cup Holder by Bookman", posted Mar. 23, 2014 online, retrieved Jun. 6, 2016 from Internet, URL: http://coolmensgear.com/removable-bicycle-cup-holder/.
"Meyers California Rainbow Mug With Removable Wood Metal Handle", retrieved from Internet on Jun. 6, 2016; URL: https://www.pinterest.com/pin/148618856430252325/.
"Tervis Tumbler Black 24 Oz. Handle", retrieved from Internet Jun. 6, 2016; URL: http://www.amazon.com/Tervis-Tumbler-Black-24oz-Handle/dp/B004VVHORG.
Purdom, Sandra, "Mug or Tumbler Metal Handles Spare Parts", retrieved from Internet Jun. 6, 2016; URL: https://www.etsy.com/...r-tumbler-metalhandles-spare-parts?ga_order=most_relevant&ga_search_type=all&ga_view_type=gallery&ga_search_query=metal%20handled%20mugs&ref=sr_gallery_8.

(56) References Cited

OTHER PUBLICATIONS

"Red Removable Handle 16-Oz. Travel Tumbler", retrieved from Internet Jun. 6, 2016, URL: http://www.zulily.com/p/red-removable-handle-16-oz-travel-tumbler-120715-7353259.html.
"Tervis Tumbler Black 24oz. Handle." Amazon.com. Accessed Aug. 31, 2016. Available online at URL: <https://www.amazon.com/Tervis-Tumbler-Black-24oz-Handle/dp/B004VVHORG>.
May 24, 2017—(WO) International Search Report and Written Opinion—App. No. PCT/US2017/022315.
Dec. 14, 2016 (WO) International Search Report and Written Opinion—App. No. PCT/US2016/055491.
United States District Court Western District of Texas Austin Division, "Complaint," *Yeti Coolers, LLC* v. *Gourmet Home Products, LLC*, Case: 1:17-cv-00533, Document #1, filed Jun. 2, 2017, 25 pages.
United States District Court Western District of Texas Austin Division, "Complaint," *Yeti Coolers, LLC* v. *Godinger Silver Art, Ltd., Cathy's Concepts, Inc., Viatek Consumer Products Group, Inc.*, Case: 1:17-cv-00467, Document #1, filed May 16, 2017, 22 pages.
United States District Court Western District of Texas Austin Division, "Complaint," *Yeti Coolers, LLC* v. *Bayou Ice Boxes, Inc.*, Case: 1:17-cv-00261, Document #1, filed Mar. 24, 2017, 41 pages.
United States District Court Western District of Texas Austin Division, "Complaint," *Yeti Coolers, LLC* v. *Vickery Products, LLC d/b/a Axis Cups, f/d/b/a Frio Cups*, Case: 1:17-cv-00260, Document #1, filed Mar. 24, 2017, 52 pages.
United States District Court Western District of Texas Austin Division, "Complaint," *Yeti Coolers, LLC* v. *Wadley Holdings, LLC d/b/a Meadowcraft, and Southern Sales & Marketing Group, Inc. d/b/a/ nICE*, Case 1:17-cv-00421, Document 1, filed May 5, 2017, 121 pages.
United States District Court Western District of Texas Austin Division, "Complaint," *Yeti Coolers, LLC* v. *JDS Industries, Inc., Lionel Laundry Jr., d/b/a Accolades Awards & Engraving, Creating and Fast LLC d/b/a Promotional Products San Antonio, Kelly Scoggins d/b/a King Engraving, Jamey Z. Apps d/b/a Roberts Trophies, and Eagle Media, Inc.*, Case 1:17-cv-00424, Document 1, filed May 5, 2017, 62 pages.
United States District Court Western District of Texas Austin Division, "Complaint," *Yeti Coolers, LLC* v. *Glacier Coolers, LLC, and Tecomate Holdings, LLC*, Case 1:17-cv-00586, Document 1, filed Jun. 15, 2017, 161 pages.
United States District Court Western District of Texas Austin Division, "Complaint," *Yeti Coolers, LLC* v. *Gametime Sidekicks, LLC*, Case 1:17-cv-00413, Document 1, filed May 5, 2017, 107 pages.
United States District Court Western District of Texas Austin Division, "Complaint," *Yeti Coolers, LLC* v. *Kodiak Coolers, LLC and Flexible Automation LLC*, Case 1:17-cv-00422, Document 1, filed May 5, 2017, 51 pages.
United States District Court Western District of Texas Austin Division, "Complaint," *Yeti Coolers, LLC* v. *Benner China and Glassware Florida, Inc.*, Case: 1:16-cv-00142-RP, Document #1, filed Feb. 16, 2016, 21 pages.
United States District Court Western District of Texas Austin Division, "Complaint," *Yeti Coolers, LLC* v. *Blackbird Products Group, LLC, d/b/a Mammoth Coolers*, Case: 1:15-cv-01105, Document #1, filed Dec. 7, 2015, 266 pages.
United States District Court Western District of Texas Austin Division, "Defendant Blackbird Products Group, LLC's Answer and Affirmative Defenses to Plaintiff Yeti Coolers, LLC's Complaint," *Yeti Coolers, LLC* v. *Blackbird Products Group, LLC, d/b/a Mammoth Coolers*, Case: 1:15-cv-01105-SS, Document #13, filed Dec. 28, 2015, 11 pages.
United States District Court Western District of Texas Austin Division, "Order," *Yeti Coolers, LLC* v. *Blackbird Products Group, LLC, d/b/a Mammoth Coolers*, Case: 1:15-cv-01105-RP, Document #26, filed Apr. 20, 2016, 1 page.

United States District Court Western District of Texas Austin Division, "Complaint," *Yeti Coolers, LLC* v. *The Boelter Companies, Inc., Boelter Brands, LLC and Boelter Beverage, LLC*, Case: 1:16-cv-00456, Document #1, filed Apr. 8, 2016, 20 pages.
United States District Court Western District of Texas Austin Division, "Defendants' Answer to Complaint," *Yeti Coolers, LLC* v. *The Boelter Companies, Inc., Boelter Brands, LLC and Boelter Beverage, LLC*, Case: 1:16-cv-00456-RP, Document #21, filed Jun. 7, 2016, 9 pages.
United States District Court Western District of Texas Austin Division, "Consent Judgment," *Yeti Coolers, LLC* v. *The Boelter Companies, Inc., Boelter Brands, LLC and Boelter Beverage, LLC*, Case: 1:16-cv-00456-RP, Document #25, filed Sep. 13, 2016, 3 pages.
United States District Court Western District of Texas Austin Division, "Complaint," *Yeti Coolers, LLC* v. *Jennifer Leverne Bootz Evans d/b/a Bling and Burlap Buy In's and Blanks*, Case: 1:15-cv-00995, Document #1, filed Nov. 2, 2015, 128 pages.
United States District Court Western District of Texas Austin Division, "Order," *Yeti Coolers, LLC* v. *Jennifer Leverne Bootz Evans d/b/a Bling and Burlap Buy In's and Blanks*, Case: 1:15-cv-00995-RP, Document #18, filed Apr. 18, 2016, 1 page.
United States District Court Western District of Texas Austin Division, "Defendant Kaiser Group Inc.'s Answer, Affirmative Defenses, and Counterclaims to Plaintiff Yeti Coolers, LLC's Complaint," *Yeti Coolers, LLC* v. *Kaiser Group Inc., d/b/a Thermo Steel, d/b/a Vino2Go, d/b/a Brew2GO*, Case: 1:15-cv-00725-RP, Document #14, filed Oct. 13, 2015, 65 pages.
United States District Court Western District of Texas Austin Division, "Complaint," *Yeti Coolers, LLC* v. *Great American Products, Ltd.*, Case: 1:15-cv-00686, Document #1, filed Aug. 6, 2015, 20 pages.
United States District Court Western District of Texas Austin Division, "Order," *Yeti Coolers, LLC* v. *Great American Products, Ltd.*, Case: 1:15-cv-00686-RP, Document #25, filed Mar. 14, 2016, 1 page.
United States District Court Western District of Texas Austin Division, "Complaint," *Yeti Coolers, LLC* v. *Home Depot U.S.A., Inc., Takeya USA Corporation*, Case: 1:17-cv-00342, Document #1, filed Apr. 12, 2017, 24 pages.
United States District Court Western District of Texas Austin Division, "Complaint," *Yeti Coolers, LLC* v. *Ideastage Promotions, LLC, d/b/a Swag Brokers*, Case: 1:15-cv-00774, Document #1, filed Sep. 2, 2015, 22 pages.
United States District Court Western District of Texas Austin Division, "Order," *Yeti Coolers, LLC* v. *Ideastage Promotions, LLC, d/b/a Swag Brokers*, Case: 1:15-cv-00774-RP, Document #19, filed Dec. 21, 2015, 1 page.
United States District Court Western District of Texas Austin Division, "Complaint," *Yeti Coolers, LLC* v. *Imagen Brands, LLC, d/b/a Crown Products, and Ebsco Industries, Inc.*, Case: 1:16-cv-00578-RP, Document #1, filed May 16, 2016, 20 pages.
United States District Court Western District of Texas Austin Division, "Complaint," *Yeti Coolers, LLC* v. *Kaiser Group Inc., d/b/a Thermo Steel, d/b/a Vino2GO, d/b/a Brew2Go*, Case: 1:15-cv-00725, Document #1, filed Aug. 19, 2015, 21 pages.
United States District Court Western District of Texas Austin Division, "Complaint," *Yeti Coolers, LLC* v. *Kuer Outdoors, LLC*, Case: 1:16-cv-00631, Document #1, filed May 27, 2016, 89 pages.
United States District Court Western District of Texas Austin Division, "Complaint," *Yeti Coolers, LLC* v. *Magnum Solace LLC*, Case: 1:16-cv-00663-RP, Document #1, filed Jun. 7, 2016, 24 pages.
United States District Court Western District of Texas Austin Division, "Defendant's Rule 12(B)(6) Motion to Dismiss for Failure to State a Claim," *Yeti Coolers, LLC* v. *Magnum Solace LLC*, Case: 1:16-cv-00663-RP, Document #10, filed Aug. 5, 2016, 30 pages.
United States District Court Western District of Texas Austin Division, "Defendant's Answer," *Yeti Coolers, LLC* v. *Magnum Solace LLC*, Case: 1:16-cv-00663-RP, Document #34, filed Apr. 13, 2017, 7 pages.
United States District Court Western District of Texas Austin Division, "Defendant's Answer to Plaintiff's Complaint and Affirmative Defenses," *Yeti Coolers, LLC* v. *MyCrew, LLC, MyCrew*

(56) References Cited

OTHER PUBLICATIONS

*Drinkware, LLC and NNRiverLife, LLC*, Case: 1:16-cv-01008-RP, Document #14, filed Nov. 29, 2016, 12 pages.
United States District Court Western District of Texas Austin Division, "Complaint," *Yeti Coolers, LLC v. MyCrew, LLC, MyCrew Drinkware, LLC and NNRiverLife, LLC*, Case: 1:16-cv-01008, Document #1, filed Aug. 26, 2016, 29 pages.
United States District Court Western District of Texas Austin Division, "Plaintiff Yeti Coolers, LLC's Original Complaint," *Yeti Coolers, LLC v. Ontel Products Corporation and World Pack USA, LLC*, Case: 1:17-cv-00091-RP, Document #1, filed Feb. 8, 2017, 65 pages.
United States District Court Western District of Texas Austin Division, "RTIC Drinkware's First Amended Complaint for Declaratory Judgment," *RTIC Drinkware, LLC v. Yeti Coolers, LLC*, Case: 1:16-cv-00907-RP, Document #52, filed Nov. 14, 2016, 124 pages.
United States District Court Western District of Texas Austin Division, "Yeti Coolers, LLC's Answer to RTIC Drinkware's First Amended Complaint," *RTIC Drinkware, LLC v. Yeti Coolers, LLC*, Case: 1:16-cv-00907-RP, Document #58, filed Dec. 1, 2016, 15 pages.
United States District Court Western District of Texas Austin Division, "Yeti Coolers, LLC's Answer to RTIC Drinkware LLC's Complaint," *RTIC Drinkware, LLC v. Yeti Coolers, LLC*, Case: 1:16-cv-00907-RP, Document #35, filed Aug. 9, 2016, 27 pages.
United States District Court for the Southern District of Texas Huston Division, "RTIC Drinkware's Original Complaint for Declaratory Judgment, Damages, and Injunctive Relief," *RTIC Drinkware, LLC v. Yeti Coolers, LLC*, Case: 4:16-cv-01201, Document #1, filed May 2, 2016, 58 pages.
United States District Court Western District of Texas Austin Division, "Order," *RTIC Drinkware, LLC v. Yeti Coolers, LLC*, Case: 1:16-cv-00907-RP, Document #47, filed Oct. 13, 2016, 3 pages.
United States District Court Western District of Texas Austin Division, "Yeti Coolers, LLC's First Amended Complaint," *Yeti Coolers, LLC v. RTIC Coolers, LLC, RTIC Drinkware, LLC, RTIC Web Services, LLC, Corporate Support & Fulfillment, LLC, John Jacobsen, and James Jacobsen*, Case: 1:16-cv-00264-RP, Document #15, filed May 16, 2016, 110 pages.
United States District Court Western District of Texas Austin Division, "Defendant RTIC Drinkware, LLC, RTIC Web Services, LLC, Corporate Support & Fulfillment, LLC, John Jacobsen, and James Jacobsen's Answer and Counterclaims to Yeti's First Amended Complaint for Damages and Injunctive Relief," *Yeti Coolers, LLC v. RTIC Coolers, LLC, RTIC Drinkware, LLC, RTIC Web Services, LLC, Corporate Support & Fulfillment, LLC; John Jacobsen; and James Jacobsen*, Case: 1:16-cv-00264-RP, Document #25, filed Jun. 13, 2016, 42 pages.
United States District Court Western District of Texas Austin Division, "Complaint," *Yeti Coolers, LLC v. RTIC Coolers, LLC*, Case: 1:16-cv-00264, Document #1, filed Mar. 2, 2016, 34 pages.
United States District Court Western District of Texas Austin Division, "Yeti Coolers, LLC's Answer to RTIC Drinkware, LLC's, RTIC Web Services, LLC's, Corporate Support & Fulfillment, LLC's, John Jacobsen's, and James Jacobsen's Counterclaims," *Yeti Coolers, LLC v. RTIC Coolers, LLC, RTIC Drinkware, LLC, RTIC Web Services, LLC, Corporate Support & Fulfillment, LLC, John Jacobsen, and James Jacobsen*, Case: 1:16-cv-00264-RP, Document #31, filed Jul. 7, 2016, 7 pages.
United States District Court Western District of Texas Austin Division, "First Amended Complaint," *Yeti Coolers, LLC v. Sam's West, Inc., and Sam's East, Inc.*, Case: 1:16-cv-00829-RP, Document #32, filed Jan. 9, 2017, 24 pages.
United States District Court Western District of Texas Austin Division, "Defendants Sam's West, Inc. and Sam's East, Inc.'s Answer to Complaint," *Yeti Coolers, LLC v. Sam's West, Inc., and Sam's East, Inc.*, Case: 1:16-cv-00829-RP, Document #16, filed Aug. 26, 2016, 11 pages.
United States District Court Western District of Texas Austin Division, "Complaint," *Yeti Coolers, LLC v. Sam's West, Inc., and Sam's East, Inc.*, Case: 1:16-cv-00829, Document #1, Jun. 30, 2016, 21 pages.
United States District Court Western District of Texas Austin Division, "First Amended Complaint," *Yeti Coolers, LLC v. Sic Products LLC, d/b/a Sic Cups, d/b/a Sic*, Case: 1:16-cv-00117-RP, Document #34, Nov. 21, 2016, 25 pages.
United States District Court Western District of Texas Austin Division, "Sic Products, LLC's Answer, Affirmative Defenses, and Counterclaims to Plaintiff's Amended Complaint," *Yeti Coolers, LLC v. Sic Products LLC, d/b/a Sic Cups, d/b/a Sic*, Case: 1:16-cv-00117-RP, Document #35, Dec. 5, 2016, 81 pages.
United States District Court Western District of Texas Austin Division, "Sic Products, LLC's Answer, Affirmative Defenses, and Counterclaims to Plaintiff's Complaint," *Yeti Coolers, LLC v. Sic Products LLC, d/b/a Sic Cups, d/b/a Sic*, Case: 1:16-cv-00117-RP, Document #14, Jun. 3, 2016, 38 pages.
United States District Court Western District of Texas Austin Division, "Defendant Takeya USA Corporation's Memorandum in Support of Rule 12(b)(6) Motion to Dismiss," *Yeti Coolers, LLC v. Home Depot U.S.A., Inc., Takeya USA Corporation*, Case: 1:17-cv-00342, Document #12, filed May 25, 2017, 34 pages.
United States District Court Western District of Texas Austin Division, "Defendant Kelly Scoggins d/b/a King Engraving's Memorandum in Support of Rule 12(b)(6) Motion to Dismiss and Motion to Take Judicial Notice," *Yeti Coolers, LLC v. JDS Industries, Inc., Lionel Landry Jr., d/b/a Accolades d/b/a Accolades Awards & Engraving, Creative and Fast LLC d/b/a Promotional Products San Antonio, Kelly Scoggins d/b/a King Engraving*, Case: 1:17-cv-00424-RP, Document #65, filed Aug. 11, 2017, 28 pages.
United States District Court Western District of Texas Austin Division, "Complaint," *Yeti Coolers, LLC v. Wal-Mart Stores, Inc.*, Case: 1:17-cv-01145, Document #1, filed Dec. 8, 2017, 98 pages.
Jun. 5, 2019—(CN) Office Action—App. No. 201780029765.X.
Feb. 6, 2020—(WO) International Search Report & Written Opinion—PCT/US19/057420.
Sep. 6, 2021—(WO) Partial International Search—PCT/US2021/030256.
Nov. 2, 2021—(WO) International Search Report & Written Opinion—PCT/US21/030256.
Dec. 16, 2021—(CN) Invalidation Notice against ZL 201630159653.4.
Jan. 30, 2022—(CN) First Office Action—App. No. 201980070432.0.
Mar. 31, 2022—(AU) Examination Report No. 1—App. No. 2019368252.
Apr. 8, 2022—(EP) Article 94(3) EPC Communication—App. No. 19802004.2.
Jun. 22, 2022—(JP) Office Action—App. No. 2021-522098.
Polar [online] URL: https://www.amazon.com/Personalized-Tumblers-Insulated-Stainless-Customized/dp/B08XT7RC9M (site visited: May 25, 2022) (Year: 2021).
Swig [online] URL: https://www.swignsweets.com/product/44-oz-handle-tumbler/ (site visited: May 25, 2022) (Year: 2022).
Stanley [online] URL: https://www.stanley1913.com/products/adventure-quencher-travel-tumbler-20-oz-new (site visited: Jul. 13, 2022) (Year: 2022).
Yoelike [online] URL: https://www.amazon.com/dp/B09Z37MGH9 (site visited: Jul. 13, 2022) (Year: 2022).
Zenbo [online] URL: https://www.amazon.com/dp/B09QL9QV4V (site visited: Jul. 13, 2022) (Year: 2022).
Jul. 27, 2022—(CA) Examination Report—App. No. 3122967.
Apr. 20, 2021—(NZ) Examination Report 1—App. No. 428747.
Jun. 7, 2021—(CN) Office Action—App. No. 2021301668853.
United States District Court Western District of Texas, Austin Division, "Complaint for Damages and Injunctive Relief", *Yeti Coolers, LLC v. Hooked Coolers, Inc.*, Case 1:21-cv-00633, Document 1, filed Jul. 16, 2021, 28 pages.
Apr. 18, 2023—(CA) Office Action—App. No. 3122967.
HPG [online] URL: https://hpgbrands.com/shop-all/40-oz-mega-tumbler-with-handle/ (site visited: Mar. 9, 2023) (Year: 2023).

(56) References Cited

OTHER PUBLICATIONS

Camel Bak [online] URL: https://www.camelbak.com/recreation/shop/bottles/drinkware/horizon-24- oz-tall-mug-insulated-stainless steel/CB-2746301071.html? (site visited: Mar. 9, 2023) (Year: 2022).
Walmart [online] URL: https://www.walmart.com/ip/Large-Travel-Coffee-Mug-Tumbler-Clear-Slide-Lid-Handle-Reusable-Vacuum-Insulated-Double-Wall-Stainless-Steel-Thermos-Fits- Cup-Holder-30oz-Navy/1377165201 (site visited: Feb. 27, 2023) (Year: 2022).
Mininoo [online] URL: https://www.amazon.com/Mininoon-Tumbler-Handle-Insulated-Bubblegum/dp/BOBPCH7XSS (site visited: Feb. 27, 2023) (Year: 2022).
Jan. 4, 2023—(JP) Final Office Action—Ap. No. 2021522098.
Jan. 27, 2023—(NZ) Examination Report No. 1—App. No. 775306.
Nov. 2, 2021—(WO) International Search Report and Written Opinion—App PCT/US2021/030256.
Dec. 22, 2021—(JP) Notification of Reason for Provisional Refusal—App. No. 2021-006754.
Aug. 1, 2023—(NZ) Examination Report 2—App. No. 775306.
Caribou Coffee [online] URL: https://www.cariboucoffee.com/producU30oz-hydration-tumbler-charcoal/ (site visited: Nov. 29, 2023) ( Year: 2023).
Jan. 10, 2023—(CN) First Office Action—App. No. 202211143061.4.
F-32 [online] URL: https://www.amazon.com/F-32-Handle-Available-PREVIOUS-Rambler/dp/B01EKKXO3A/ (site visited:Feb. 11, 2022) (Year: 2016).
Yeti(Mug) [online] URL: https://www.amazon.com/YETI-Rambler-Stainless-Vacuum-Insulated/dp/B074W99X7X?th=1 (site visited:Feb. 11, 2022) (Year: 2017).
Yeti(Tumbler) [online] URL: https://www.amazon.comNETI-Rambler-Stainless-Insulated-Tumbler/dp/B06WVJ8VRP/ (site visited:Feb. 11, 2022) (Year: 2017).
Stanley [online] URL: https://www.youtube.com/watch?v=SgDWWyUflbo (site visited:Feb. 11, 2022) (Year: 2020).
Sursip [online] URL: https://www.amazon.com/Sursip-Stainless-Tumbler-Double-Insulated/dp/B0919XFLGP/ (site visited:Feb. 11, 2022) (Year: 2021).
Yeti [online] URL: https://www.amazon.com/YETI-Rambler-Stainless-Insulated-Stronghold/dp/B098YV2WMP/ (site visited:Feb. 11, 2022) (Year: 2021).
Reduce HOT1 [online] URL: https://www.picknsave.com/p/reduce-hot1-travel-mug/0084281511960 (site visited:Feb. 11, 2022) (Year:2022).
Nov. 27, 2023—(EP) Extended Search Report—App. No. 23195189.8.
Apr. 18, 2024—(AU) Examination Report 1—App. No. 2023200498.
Jan. 17, 2024—(JP) First Office Action—App. No. 2023-507439.
May 1, 2024—(CN) Second Office Action—App. No. 202211143061.4.
May 30, 2024—(MX) First Office Action—App. No. MX/a/2021/004632.
May 29, 2024—(CA) First Office Action—App. No. 3189791.
Feb. 23, 2024—(AU) Examination Report No. 1—App. No. 2021322575.
Stanley [online] URL: https://www.stanley1913.com/products/adventure-quencher-travel-tumbler-20-oz (site visited: Mar. 12, 2024 ( Year: 2022).
Abbrevi [online] URL: https://www.amazon.com/Abbrevi-Stainless-Tumbler-Handle-Insulated/dp/BOBV21YMZG?th=1 (site visited: Mar. 12, 2024 (Year: 2023).
Hydrate [online] URL: https://www.amazon.com/HYDRATE-Bottles-Travel-Tumbler-Handle/dp/BOBQCFYK9C?th=1 (site visited: Mar. 12, 2024 (Year: 2023).
Mollcity [online] URL: https://www.amazon.com/Mollcity-16-Reusable-Stainless-Insulated/dp/BOCDQ57PDH (site visited: Mar. 12, 2024 (Year: 2023).
Zukro [online] URL: https://www.amazon.com/dp/BOCRDYSSGF (site visited: Mar. 12, 2024 (Year: 2024).
Aug. 28, 2024—(JP) Second Office Action—App. No. 2023-507439.
Aug. 28, 2024—(NZ) First Examinatoin Report—App. No. 796419.
Sep. 11, 2024—(EP) Extended Search Report—App. No. 24171364.3.
United States District Court Western District of Texas Austin Division, "Second Amended Complaint," *Yeti Coolers, LLC* v. *Sam's West, Inc., and Sam's East, Inc., and CY Top, Ltd.*, Case: 1:16-cv-00829-RP, Document #51, filed Sep. 22, 2017, 49 pages.
United States District Court Western District of Texas Austin Division, "Complaint," *Yeti Coolers, LLC* v. *Bonanza.com, Inc.*, Case: 1:17-cv-00935, Document #1, filed Sep. 28, 2017, 142 pages.
United States District Court Western District of Texas Austin Division, "Complaint," *Yeti Coolers, LLC* v. *Alibaba Group Holding Limited, Alibaba (China) Technology Co., Ltd., Alibaba.com Hong Kong Limited, Alibaba.com Singapore E-Commerce Private Limited, Hangzhou Alibaba Advertising Co. Ltd., and Huizhou Dashu Trading Co., Ltd*, Case: 1:17-cv-00936, Document #1, filed Sep. 28, 2017, 272 pages.
United States District Court Western District of Texas Austin Division, "Complaint," *Yeti Coolers, LLC* v. *ContextLogic, Inc. d/b/a Wish.com*, Case: 1:17-cv-00937, Document #1, filed Sep. 28, 2017, 238 pages.
United States District Court Western District of Texas Austin Division, "Complaint," *Yeti Coolers, LLC* v. *Dunhuang Group, SZ Flowerfairy Technology Co., Ltd., Tan Er Pa Technology Co., Ltd., Shenzhen Great Electronic Technology Co., Ltd., and Huagong Trading Co.,* Case: 1:17-cv-00938, Document #1, filed Sep. 28, 2017, 272 pages.
"Bubba Classic Insulated Travel Mug with Handle, 34 oz., Black"; Amazon; retrieved Oct. 17, 2019; published Jul. 26, 2010; URL: <https://www.amazon.com/Bubba-Classic-Insulated-Travel-Handle/dp/B01DGMBG5Q/?tag=gatheringgroundsbm-20>.
"Fine Ceramics: Harder Than Stainless Steel", Charactersitics of Fine Ceramics, Physical-Hardness, Fine Ceramics World (2009).
Sep. 10, 2020—(CN) Third Office Action (incl. English Translation)—App. No. 201780029765.X.
"Block C Over Cornell Stainless Tumbler with Handle 20 oz"; The Cornell Store; retrieved Sep. 24, 2019; disclosure date unknown but prior to the filing date of the present application; URL: <https://www.cornellstore.com/Block-C-Over-Cornell-Stainless-Tumbler-With-Handle-20-Oz.>.
"The Grapplr Yeti Cup Handle"; The Grapplr, retrieved Sep. 24, 2019; disclosure date unknown but prior to the filing date of the present application; URL: <http://thegrapplr.com/>.
"Mossy Oak Stainless Steel Tumbler Handle"; Pinshape; retrieved Sep. 24, 2019; disclosure date unknown but prior to the filing date of the present application; URL: <https://pinshape.com/items/37037-3d-printed-mossy-oak-stainless-steel-tumbler-handle>.
"Oneb Car Cup Travel Mug 450ml with handle Stainless Steel Coffee Insulated Milk"; Coffee-Mug; retrieved Sep. 24, 2019; disclosure date unknown but prior to the filing date of the present application; URL: <https://mugs.coffee-mug.org/oneb-car-cup-travel-mug-450ml-with-handle.html?product_id=YIFpDgnD_VD3Ew>.
"White Polymer Travel Mug"; Coola Products; retrieved Sep. 24, 2019; disclosure date unknown but prior to the filing date of the present application; URL: <https://www.coola-products.com/white-polymer-travel-mug>.
"Ozark Trail 12 Oz Stainless Steel Coffee Mugs 4 Pack"; Amazon; retrieved Sep. 24, 2019; disclosure date unknown but prior to the filing date of the present application; URL: <https://www.amazon.com/Ozark-Trail-Stainless-Steel-Coffee/dp/B07MQ1BZGP/ref=asc_df_B07MQ1BZGP/?tag=bingshoppinga-20&linkCode=df0&hvadid={creative}&hvpos={adposition}&hvnetw=o&hvrand={random}&hvpone=&hvptwo=&hvqmt=&hvdev=c&hvdvcmdl={devicemodel}&hvlocint=&hvlocphy=&hvtargid=pla-4583451664950027&psc=1>.
"Travel Coffee Cup, Polar Cap"; RTIC; retrieved Sep. 24, 2019; disclosure date unknown but prior to the filing date of the present application; URL: <https://www.rticcoolers.com/shop/drinkware/tumblers/Travel-Coffee-Cup-Polar-Cap>.
"Bubba Classic Insulated Travel Mug, 20 Ounce"; Walmart; retrieved Oct. 17, 2019; disclosure date unknown but prior to the filing date of the present application; URL: <https://www.walmart.com/ip/Bubba-Classic-Insulated-Travel-Mug-20-Ounce/51636951>.

(56) References Cited

OTHER PUBLICATIONS

"Cold-1 Thermal Mug 40oz"; Walmart; retrieved Oct. 17, 2019; Falsedisclosure date unknown but prior to the filing date of the present application; URL: <https://www.walmart.com/ip/Cold-1-Thermal-Mug-40oz/880572762>.

"Thermos Stainless King 16 Ounce Travel Mug with Handle, Midnight Blue"; Amazon; retrieved Oct. 17, 2019; published Sep. 22, 2009; URL: <https://www.amazon.com/Thermos-Stainless-Travel-Handle-Midnight/dp/B002PY7AYI>.

* cited by examiner

CONTAINER AND METHOD OF FORMING A CONTAINER

CROSS REFERENCE TO RELATED APPLICATIONS

This application claims the benefit of, and priority to, U.S. Provisional Patent Application No. 62/308,046, filed Mar. 14, 2016. The content of which is expressly incorporated herein by reference in its entirety for any and all non-limiting purposes.

FIELD

The present disclosure herein relates broadly to containers, and more specifically to drinkware containers used for drinkable beverages or foods.

BACKGROUND

A container may be configured to store a volume of liquid. Containers can be filled with hot or cold drinkable liquids, such as water, coffee, tea, soft drink, or alcoholic beverage, such as beer. These containers can be formed of a double-wall vacuumed formed construction to provide insulative properties to help maintain the temperature of the liquid within the container.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In certain examples, an insulating container can be configured to retain a volume of liquid. The insulating container can include a first inner wall having a first end with an opening extending into an internal reservoir for receiving liquid, along with a second outer wall and a bottom portion forming an outer shell of the container. The bottom portion forms a second end configured to support the container on a surface.

The bottom portion may also include a dimple. The dimple can include a circular base and an inner portion converging to an opening extending into the second outer wall. The opening can be sealed by a resin. In one example, a circular base of the dimple can be covered by disc formed of the same material as the container. Alternatively, in another example, a cap can cover the dimple, and a weld can connect the cap to the second outer wall. The container can also include a sealed vacuum cavity forming an insulated double wall structure between the first inner wall and the second outer wall.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different components of various examples; however, the disclosed examples are not limited to that particular scale.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope and spirit of the present disclosure.

Figure 1:
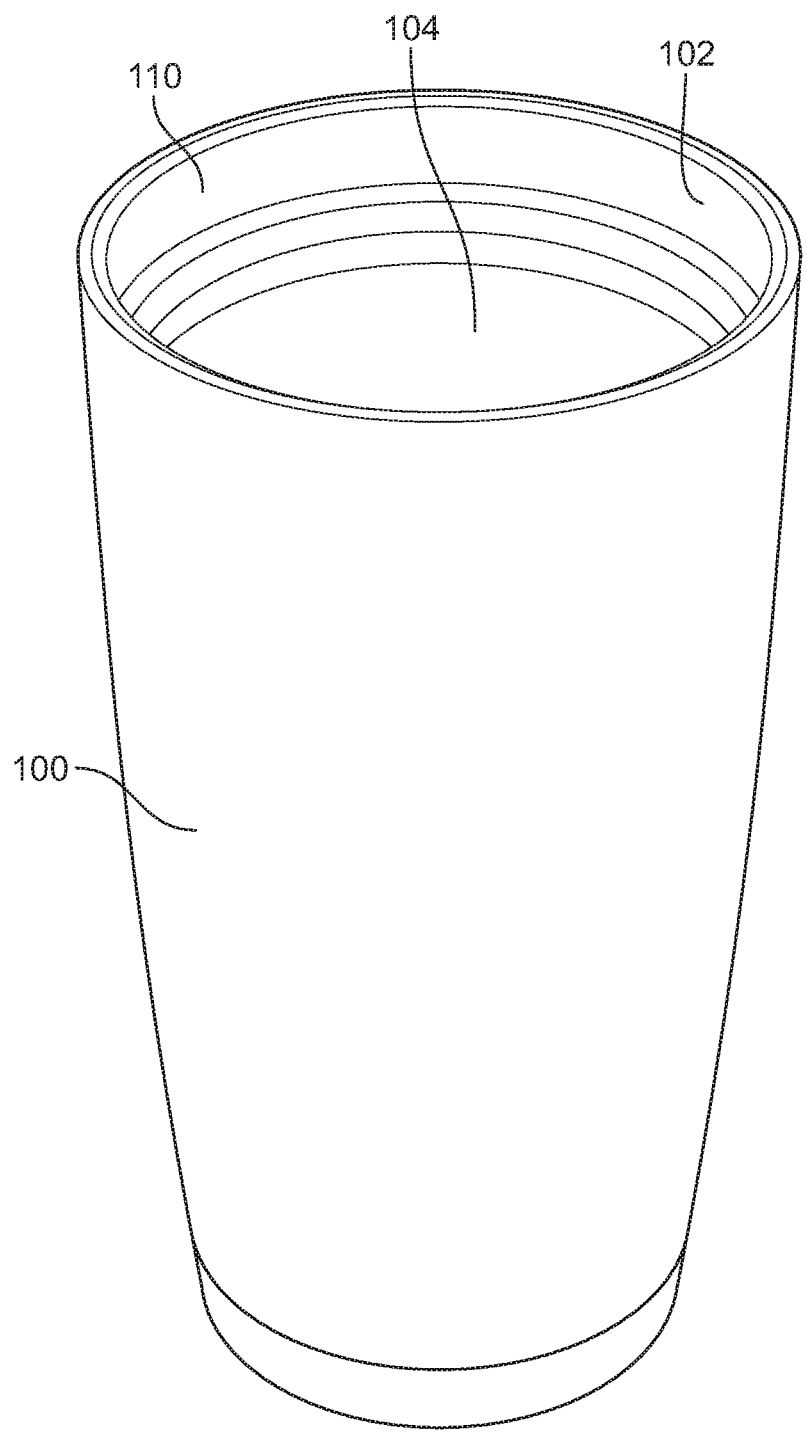
FIG. 1 depicts an isometric view of an example container, according to one or more aspects described herein.

Aspects of this disclosure relate to a container or tumbler configured to store a volume of liquid. FIG. 1 depicts an isometric view of an insulating container 100. In one example, the container 100 may be configured to store a volume of liquid. The container 100 generally includes a top portion having an opening 102 and an internal reservoir 104 for storing a liquid.

Figure 2:
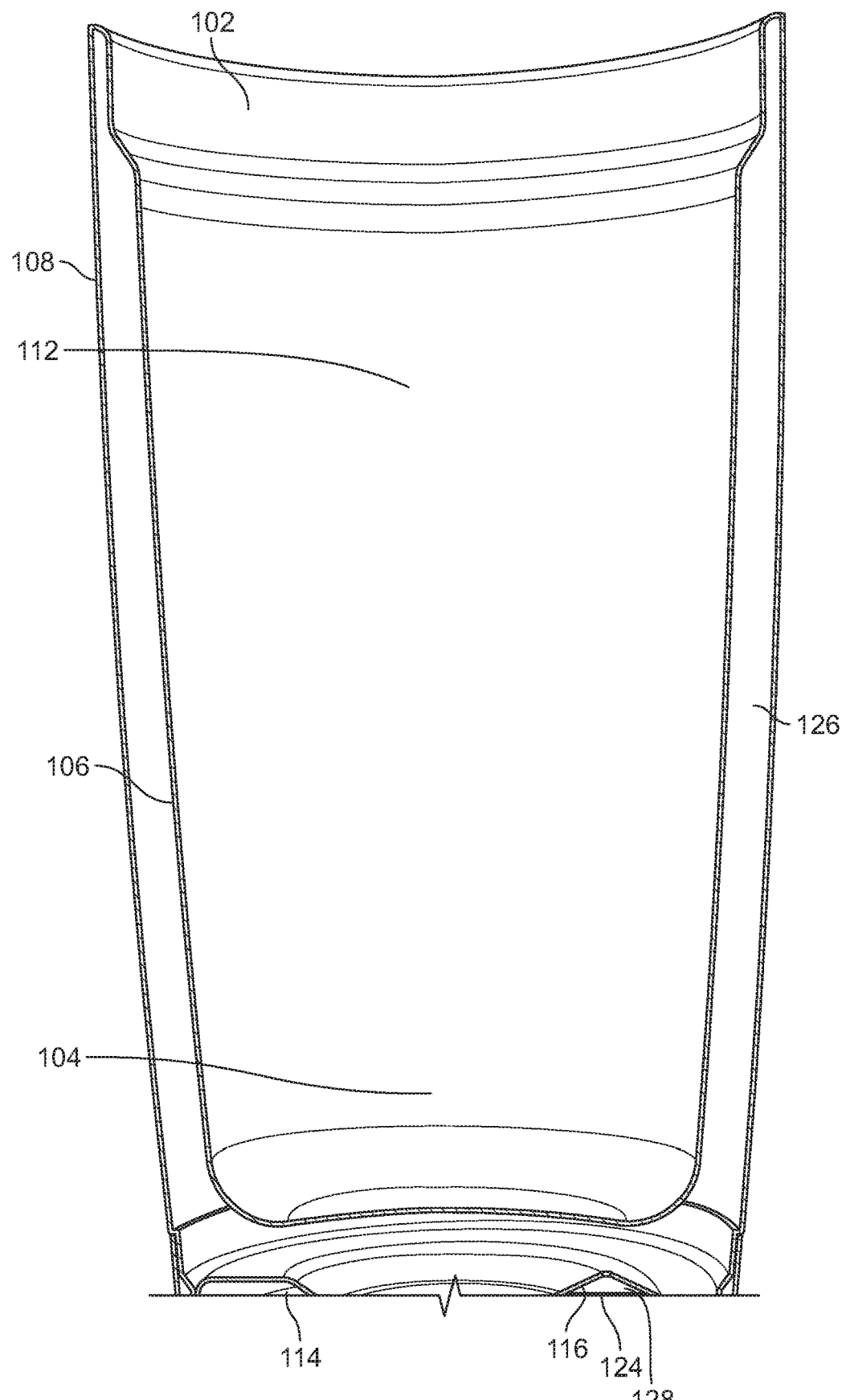
FIG. 2 depicts a cross-sectional view of the container of FIG. 1, according to one or more aspects described herein.

As shown in FIG. 2, which is a cross-sectional view of the container 100, the container 100 includes a first inner wall 106 and a second outer wall 108. The first inner wall 106 and the second outer wall 108 form a sealed vacuum cavity 126 between the first inner wall 106 and the second outer wall 108 to form an insulated double-wall structure. The first inner wall 106 has a first end 110 which defines the opening 102 extending into the internal reservoir 104 for receiving liquid. The second outer wall 108 forms an outer shell of the container 100. The second outer wall 108 can be formed of a side wall 109 and a bottom portion 128, which forms a second end 114 to support the container 100 on a surface.

The bottom portion 128 can include a dimple 116 that is used during the vacuum formation process, which is discussed in further detail below. Ultimately, however, as will be discussed in further detail below, the dimple 116 can be covered by a correspondingly-shaped disc 124 such that the dimple 116 is not visible to the user. It is noted, however, that the disc 124 is shown in the various views with different shading from the container 100 to better illustrate the aspects of the disc 124 to the reader.

Figure 3:
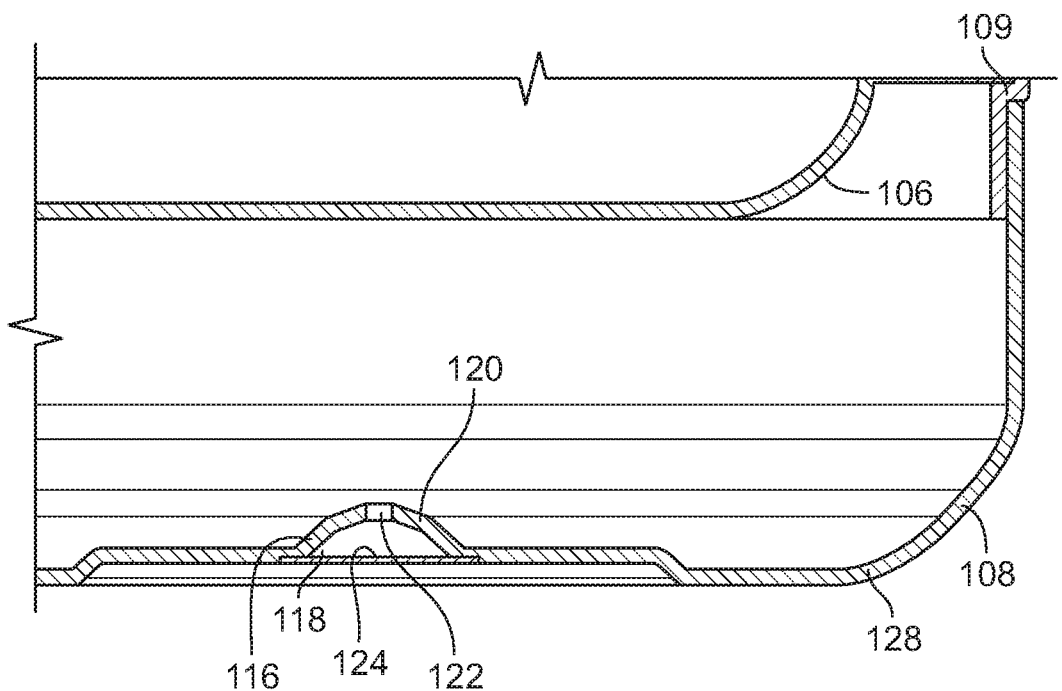
FIG. 3 depicts a partial and enlarged cross-sectional view of the container of FIG. 1, according to one or more aspects described herein.
Figure 4A:
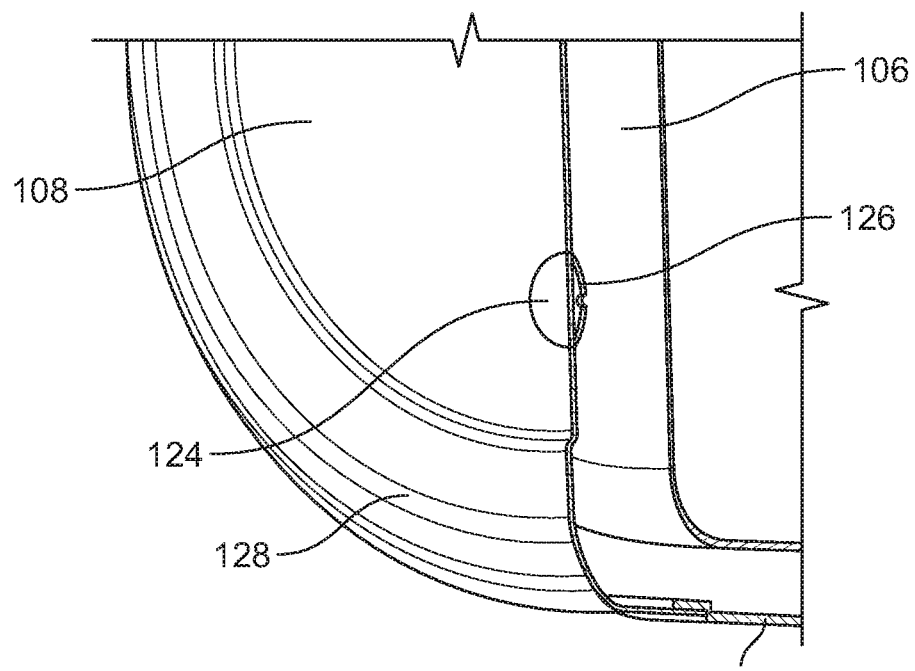
FIG. 4A depicts another partial and enlarged cross-sectional view of the container of FIG. 1, according to one or more aspects described herein.

FIGS. 3 and 4A show magnified portions of cross-sections of the container 100 illustrating the dimple 116 in additional detail. The dimple 116 can generally resemble a dome shape. However, other suitable shapes are contemplated for receiving the resin material during the manufacturing process, such as a cone, or frustoconical shape. The dimple 116 can include a circular base 118 and an inner portion 120 converging to an opening 122 extending into the second outer wall 108. As discussed below, the opening 122 can be sealed by a resin (not shown). During the formation of the vacuum between the first inner wall 106 and the second outer wall 108, the resin seals the opening 122 to provide the sealed vacuum cavity 126 between the first inner wall 106 and the second outer wall 108 in formation of the insulated double-wall structure.

The circular base 118 can be covered by the disc 124, which can be formed of the same material as the second outer wall 108 and the first inner wall 106. For example, the first inner wall 106, the second outer wall 108, and the disc 124 can be formed of either titanium or stainless steel. However, other suitable materials are contemplated as discussed herein.

In one example, the disc 124 can be placed flush with the bottom surface 128 of the second outer wall 108. After the disc 124 is secured to the bottom portion 128 of the second outer wall 108, the disc can be polished, for example by mechanical abrasion (grinding wheel, polishing wheel, etc.), chemical polishing, or electro-chemical polishing. In this way, the disc 124 and the dimple 116 are not visually apparent to the end user.

In one example, the disc 124 can be connected to the second outer wall 108 by welding. For example, the disc 124 can be laser welded, arc welded, silver soldered, or brazed to the second outer wall 108 about the perimeter of the circular base 118 of the dimple 116. In certain instances, a laser welding process can help to provide a less noticeable welding line to provide a cleaner look on the final product. Specifically, the weld line is smaller and less polishing is required to hide the weld line to the user.

In another example, the resin can seal the disc 124 to the second outer wall 108. In this example, during the vacuumization process as described herein, the disc 124 could be placed on top of a larger amount of resin such that during the heating of the resin, the disc 124 would then be secured to the container 100. Again, after the disc 124 is secured to the second outer wall 108, the disc 124 can be polished such that the disc 124 is not readily apparent or noticeable to the user.

Figure 4B:
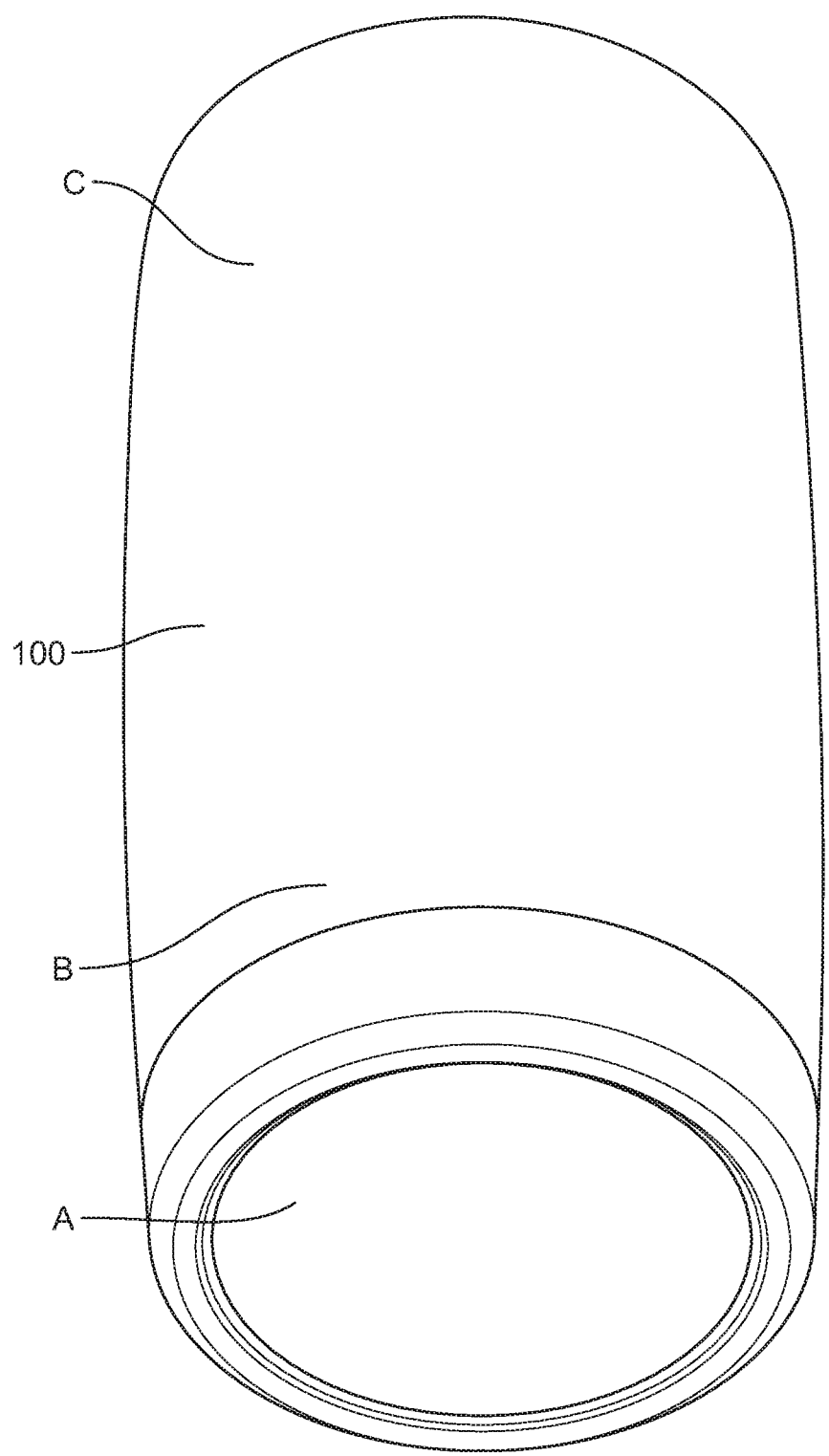
FIG. 4B depicts another isometric view of the container of FIG. 1, according to one or more aspects described herein.

The dimple 116 is located in the bottom portion 128 of the second outer wall 108. As shown in FIG. 2, the dimple 116 can be offset from a center of the bottom portion 128. This can allow for the placement of a logo on the bottom portion of the container 200. In alternative examples, the dimple 116 can be located in other locations in the second outer wall 108. For example, the dimple 116 can be located in different locations on the bottom portion 128 or any one of the side surfaces of the container 100 on the second outer wall 108 as illustrated by A, B, and C in FIG. 4B. It is also contemplated that the dimple 116 could be located at any location on the first inner wall 106. It is also contemplated that multiple dimples could also be provided if desired for forming the vacuum area.

Figure 5:
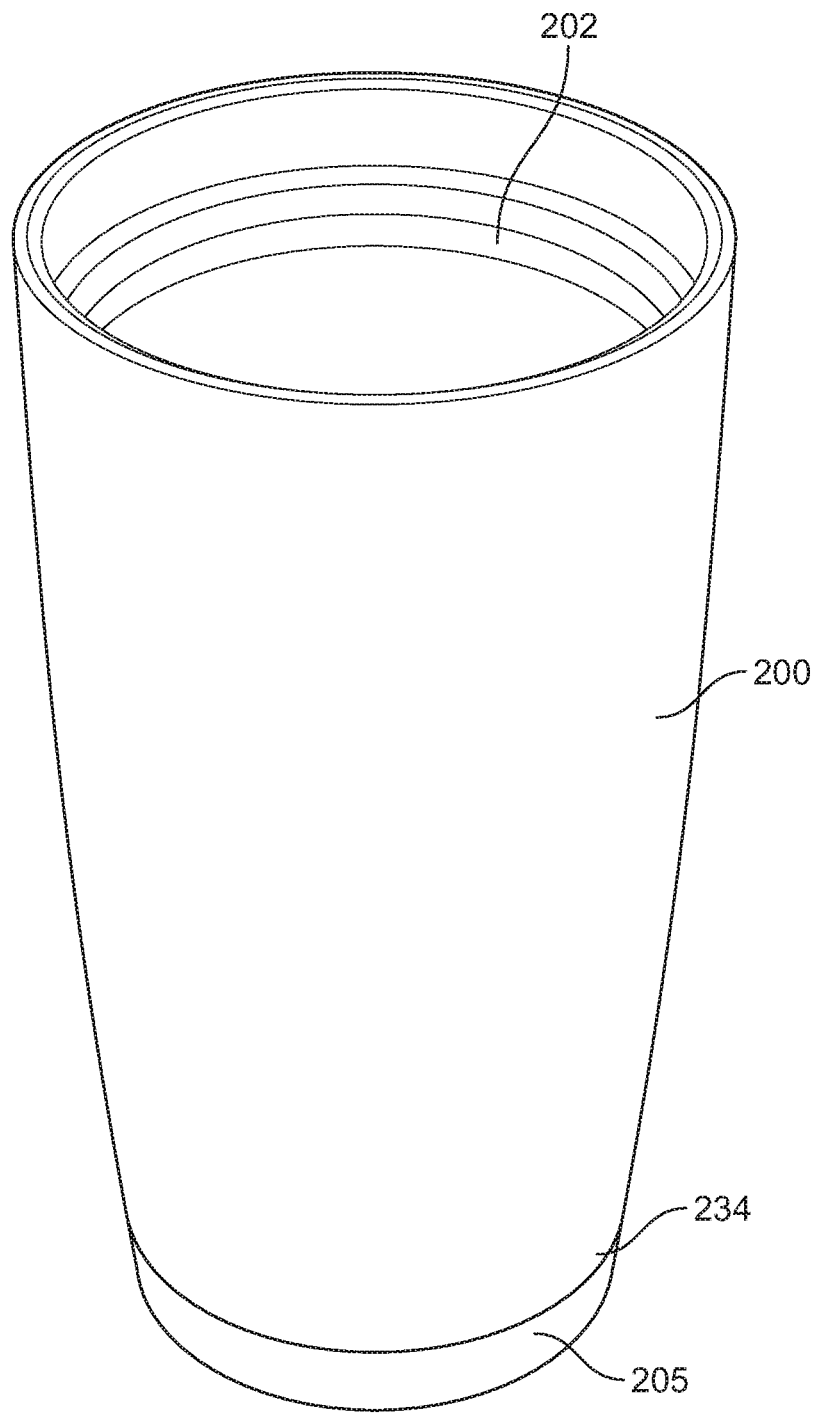
FIG. 5 depicts an isometric view of another example container, according to one or more aspects described herein.
Figure 6:
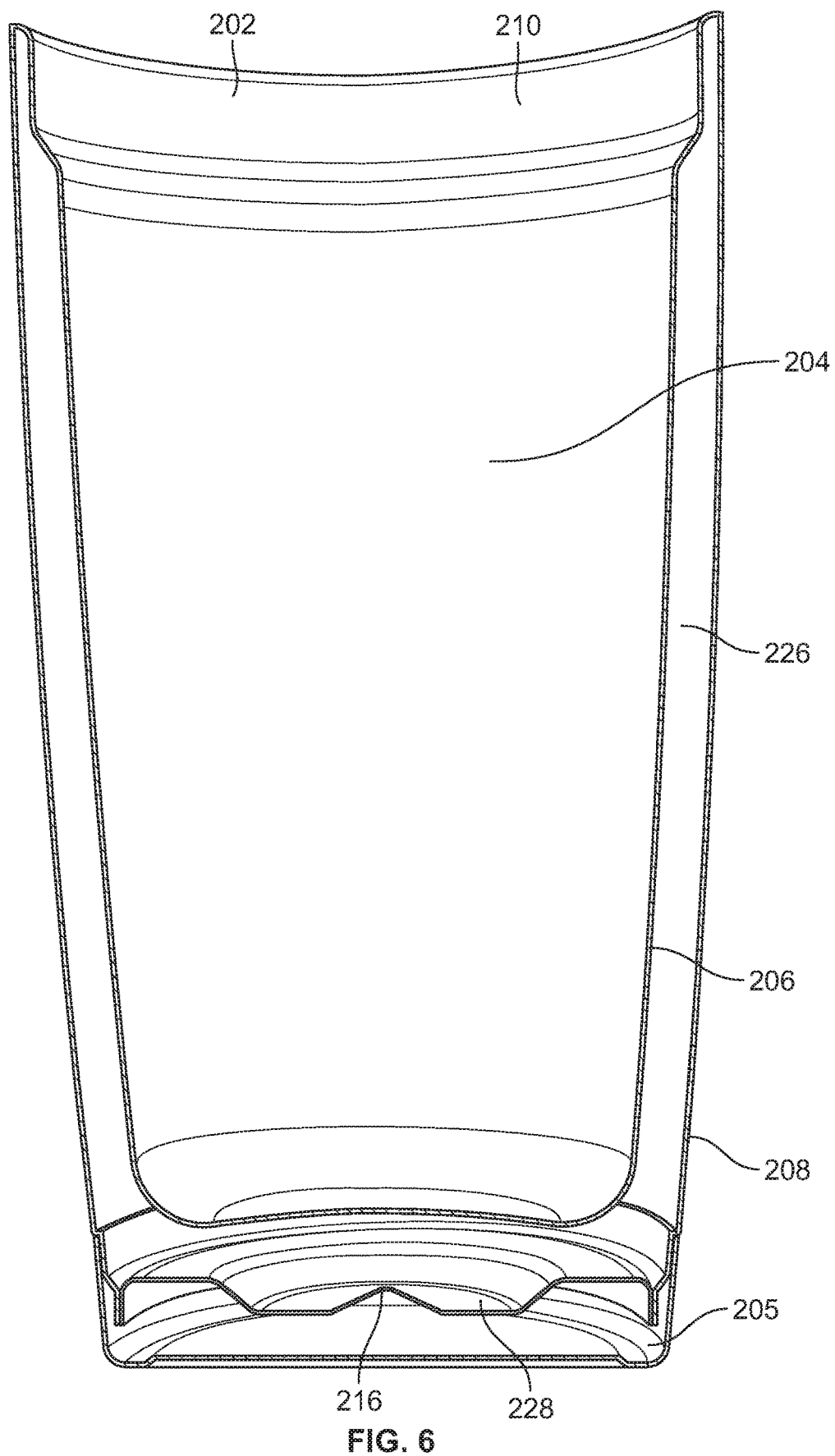
FIG. 6 depicts a cross-sectional view of the container of FIG. 5, according to one or more aspects described herein.

FIG. 5 depicts an isometric view of another example container 200, and FIG. 6 depicts a cross-sectional view of the example container, in which like reference numerals indicate similar elements, which have similar features and functionality as in the example discussed in relation to FIGS. 1-4. Similar to the above example, the container 200 generally includes a top portion having an opening 202 leading to an internal reservoir 204 for storing a liquid. However, in this example, the container 200 may comprise an end cap 205.

Like in the above example, the container 200 generally includes a top portion having an opening 202 and an internal reservoir 204 for storing a liquid. Also as shown in FIG. 6, which is a cross-sectional view of the container 200, the container 200 includes a first inner wall 206 and a second outer wall 208. The first inner wall 206 and the second outer wall 208 form a sealed vacuum cavity 226 between the first inner wall 206 and the second outer wall 208 to form an insulated double-wall structure. The first inner wall 206 has a first end 210 which defines the opening 202 extending into the internal reservoir 204 for receiving liquid. The second outer wall 208 forms an outer shell of the container 200. The second outer wall 208 also includes a bottom section 228, which can include concentric ridges to increase the rigidity of the otherwise flat structure, so that it does not deflect inward during formation of the vacuum, where it could potentially touch the inner wall 206 and compromise the vacuum insulation.

Like in the above example, as shown in FIG. 6, the second outer wall 208 can include a dimple 216 that is used during the vacuum formation process discussed herein. The dimple 216 can be located in the bottom section 228 of the second outer wall 208. More specifically, the bottom section 228 defines a center, and the dimple 216 can be located at the center. In this example, the dimple 216 can resemble a dome shape. However, as discussed herein, other suitable shapes are contemplated for receiving the resin material during the manufacturing process.

In this example, the end cap 205 covers the dimple 216. Moreover, the end cap 205 can be welded to the second outer wall 208. The weld forms a seam 234, and the seam 234 can be polished such that the weld is not apparent to the user. It is noted, however, that the seam 234 is illustrated in the drawings to better illustrate the exemplary features of the container 200 to the reader. In addition to covering the dimple 216, the end cap 205 also supports the container 200 on a surface.

Figure 7:
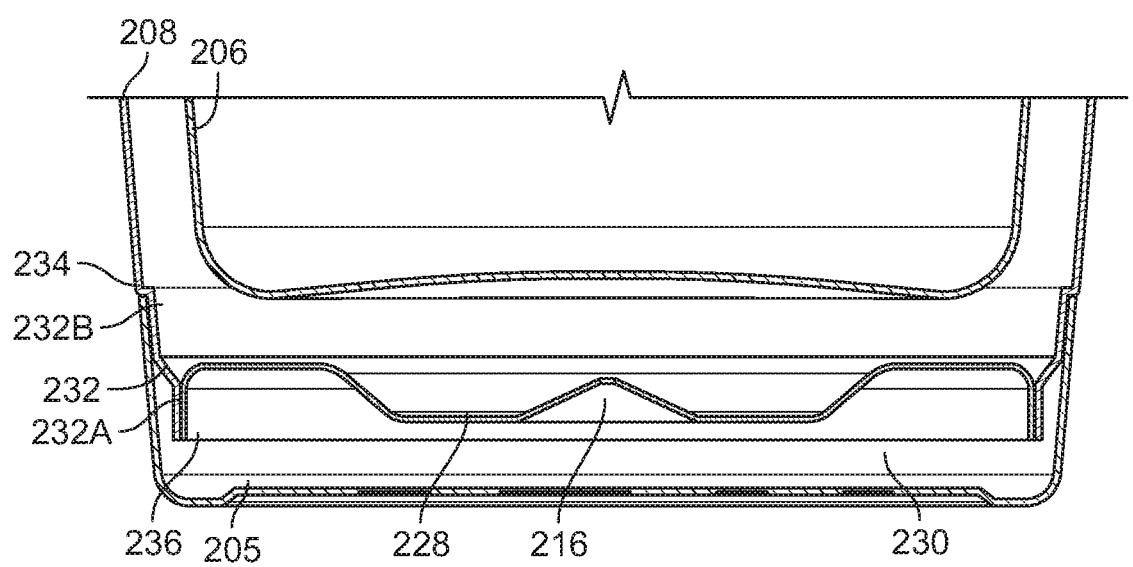
FIG. 7 depicts a partial and enlarged cross-sectional view of the container of FIG. 5, according to one or more aspects described herein.

FIG. 7 shows an enlarged view of a cross-sectional view of the assembly of the end cap 205 to the second outer wall 208. The second outer wall 208 can include a radially and axially extending flange 232, which includes a first portion 232A and a second portion 232B diverging from the first portion 232A. The first portion 232A receives the bottom section 228 of the second outer wall 208, and the second portion 232B receives the end cap 205.

Specifically, the first portion 232A of the flange 232 provides a mounting surface for the bottom section 228 of the second outer wall 208. The bottom section 228 includes a corresponding flange 236 that extends in the axial direction. The bottom section 228 of the second outer wall 208 can be press-fit onto the second outer wall 208 on the inner wall of the first portion 232A of the flange 232, and the bottom section flange 236 can be welded to the first portion 232A of the flange 232 by any suitable welding method, such as a laser welding, brazing process, arc welding, or a silver soldering.

The end cap 205 can be secured to the second portion 232B of the flange 232. In particular, the end cap 205 can also be press fit onto the outer surface of the first portion 232A of the flange. After the end cap 205 is press-fit onto the first portion 232A of the flange, the end cap 205 can be welded in place by any suitable welding method, such as a laser welding, brazing process, arc welding, or a silver soldering, to form the seam 234. Again, after the end cap 205 is welded into place, the seam 234 can be polished such that it is no longer noticeable to the user.

Referring to both exemplary containers 100, 200, both the second outer wall 108 and the end cap 205 can be configured to dampen the amount of sound that occurs when the containers 100, 200 are placed onto a surface. In one example, a weight component, for example rubber, plastic, or metal, can be included on the backside of the second outer wall 108 or within the end cap 205 for damping sound when the containers 100, 200 are placed on a surface.

In the case of the end cap, as shown in FIG. 7, an internal cavity 230 is formed between a bottom wall of the cap and the second outer wall 208. In one example, the weight component can be included in the internal cavity 230 of the end cap 205 in order to decrease the sound of the container 200 when it is placed onto a surface.

Moreover, the component can be adhered, removably fastened or welded to the second outer wall or the end cap 205 in the internal cavity 230 to assist in damping the sound when the containers 100, 200 are placed onto a surface. In the case of including the weight component in the second outer wall 108, the weight component can be configured to withstand the heat of the vacuumization chamber, which in certain instances can be greater than 500° C. However, the weight component placed into the end cap 205 for damping purposes does not have to be configured to withstand the heat of the vacuumization chamber, since the end cap 205 can be added after the vacuum is formed.

Other sound damping techniques are contemplated. For example, the second outer wall 108 or the end cap 205 can be provided with a ripple shape or can be provided with various undulations in order to provide damping when the containers 100, 200 are placed onto a surface. In yet another example, multiple divots could be provided on the second outer walls 108, 208, and each divot can be filled with resin to provide for additional sound damping when the containers 100, 200 are placed onto a solid surface.

In another example, the wall thickness of the bottom portion 128 of the second outer wall 108 can be greater than the thickness of the side walls 109 to assist in damping the sound when the insulating container 100 is placed onto a surface. In certain examples, the wall thickness of the side walls 109 can be approximately 0.5 mm to 0.75 mm, and the wall thickness of the bottom portion 128 can be approximately 0.8 mm to 1.1 mm. In one specific example, the side walls thickness can be approximately 0.7 mm, and the wall thickness of the bottom portion 128 can be approximately 0.9 mm to 1.5 mm or greater. Therefore, in certain examples, the wall thickness of the bottom portion 128 can be twice as thick as the wall thickness of the side walls 109. Additionally, the first inner wall 106 thickness can be the same thickness as the side wall thickness.

In another example, the wall thickness of end cap 205 can be greater than the thickness of the second outer wall 208 to assist in damping the sound when the insulating container 200 is placed onto a surface. In certain examples, the wall thickness of the second outer wall 208 can be approximately 0.5 mm to 0.75 mm, and the wall thickness of the end cap 205 can be approximately 0.8 mm to 1.5 mm or greater. In one specific example, the outer wall thickness can be approximately 0.7 mm, and the wall thickness of the cap can be approximately 0.9 mm to 1.1 mm. Therefore, in certain examples, the wall thickness of the end cap 205 can be twice as thick as the wall thickness of the second outer wall 208. Additionally, the first inner wall 206 thickness can be the same thickness as the second outer wall 208 thickness.

In accordance with the examples discussed herein, the containers 100 and 200 may include one or more insulating elements configured to reduce a rate of heat transfer to or from a material stored within the container. Also as discussed herein, the containers 100 and 200 may be configured with a vacuum-sealed insulating structure, which can also be referred to as a vacuum-sealed double wall structure, or an insulated double wall structure, and such that a vacuum is maintained between the first inner walls 106, 206 and the second outer walls 108, 208 of the containers 100 and 200. As discussed herein, sealed vacuum cavities 126, 226 may be sandwiched between the first inner walls 106, 206 and the outer walls 108, 208.

In accordance with the examples discussed herein, implementations of insulating structures that utilize one or more vacuum chambers to reduce heat transfer by conduction, convection and/or radiation may be utilized within the containers 100, 200. To achieve a vacuum between the walls of the container, the air within the container can be removed by heating the container within the vacuum and removing the air between the first inner walls 106, 206 and the second outer walls 108, 208 through the openings in the divots or dimples 116, 216 located on the second outer walls 108, 208. Specifically, the containers 100, 200 can be oriented inverted within a vacuum formation chamber, and a resin, which can be in the shape of a pill, can be placed into the divot or dimple during the vacuum forming process. In certain examples, the resin can be approximately 3 mm to 5 mm in diameter, and the openings in the dimples 116, 216 can be approximately 1 mm in size. In this way, when the containers 100, 200 are heated the resin becomes viscous so as to not flow or drip into the container through the opening, but permeable to air such that the air escapes the internal volumes of the containers. Once the resin cools and solidifies, it covers the openings of the dimples 116, 216 and seals the internal volumes of the containers 100, 200 to form the vacuums within the containers 100, 200.

The divots' openings can then be covered or sealed such that water and other debris do not come into contact with the resin or the dimple. As discussed herein, the dimples or divots 116, 216 can be covered or sealed with either a disc 124 or with an end cap 205. Welding the disc 124 to the bottom of the container 100 or welding the end cap 205 to the bottom of the second outer wall 208 provides a more permanent structure that can be repeatedly used and washed without compromising the structural integrity of the containers 100, 200. Covering the divots with the disc may result in a more compact container since the end cap will add to the overall length of the container. This may help in saving costs in manufacturing the container, since less material is needed. Additionally, the container will be able to store more liquid within a smaller container volume and length.

In addition, various other techniques can be used to cover or seal the dimple, which may include painting the resin, powder coating the dimple, adhering metal or paper over the opening, or adding a rubber or plastic piece to cover the opening. Including a rubber or plastic piece on the bottom may also provide a non-skid surface, which can prevent the container from sliding along a smooth surface.

Additional alternate methods of insulating the containers 100, 200 are also contemplated. For example, the cavities 126, 226 between the first inner walls 106, 206 and the outer walls 108, 208 may be filled with various insulating materials that exhibit low thermal conductivity. As such, the cavities 126, 226 may, in certain examples, be filled with air to form air pockets for insulation or a mass of material such as a polymer material, or a polymer foam material. In one specific example, the cavities 126, 226 may be filled with polystyrene. However, additional or alternative insulating materials may be utilized to fill the cavities 126, 226, without departing from the scope of these disclosures.

Moreover, a thickness of the cavities 126, 226 may be embodied with any dimensional value, without departing from the scope of these disclosures. Also, an inner surface of one or more of the first inner walls 106, 206 or the second outer walls 108, 208 of the containers 100, 200 may comprise a silvered surface, copper plated, or covered with thin aluminum foil configured to reduce heat transfer by radiation. It is also contemplated that the containers 100, 200 can include insulated lids for preventing heat transfer to or from liquids stored within the containers 100, 200. Such lids can be insulated using the techniques described herein.

In certain examples, the containers 100, 200 may be constructed from one or more metals, alloys, polymers, ceramics, or fiber-reinforced materials. Additionally, the containers 100, 200 may be constructed using one or more hot or cold working processes (e.g. stamping, casting, molding, drilling, grinding, forging, among others). For example, the first inner walls 106, 206 and the second outer walls 108, 208 can be formed as single sheets of material and rolled into cylinders and welded together at a seam. The seam can be polished such that the welded portions are not visible to the user. In one implementation, the containers 100, 200 may be constructed using a stainless steel. In one specific example, the container 100, 200 may be formed substantially of 304 stainless steel. In another implementation, the containers 100, 200 may be constructed using titanium or a titanium alloy.

Figure 8:
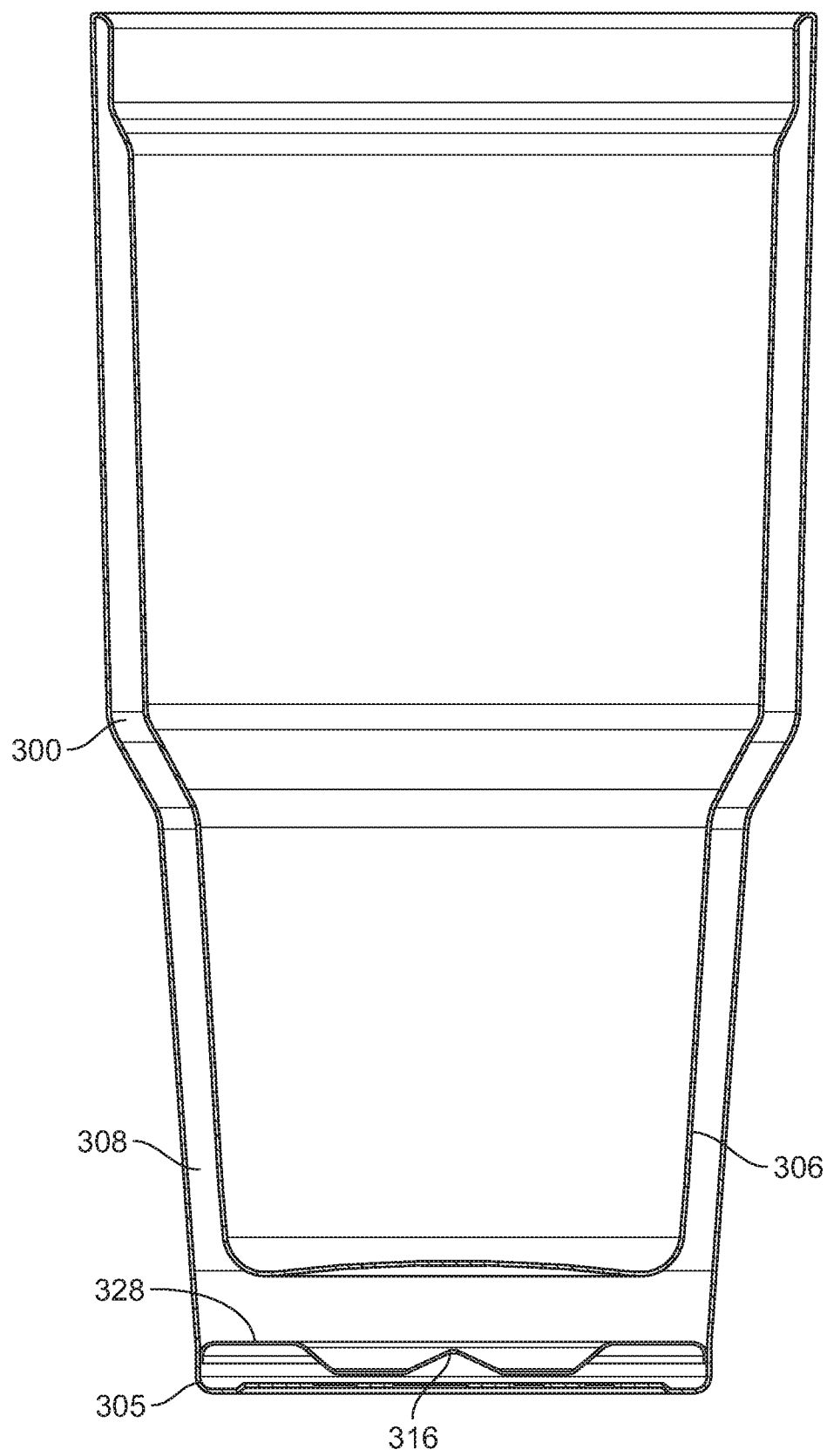
FIG. 8 depicts a cross-sectional view of another example container, according to one or more aspects described herein.
Figure 9:
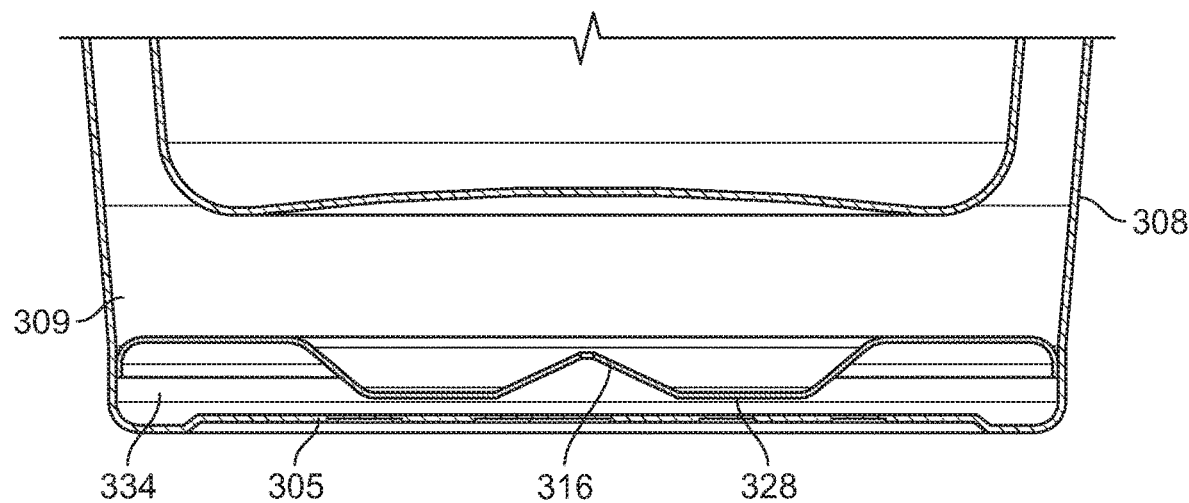
FIG. 9 depicts a partial and enlarged cross-sectional view of the example container of FIG. 8, according to one or more aspects described herein.
Figure 10:
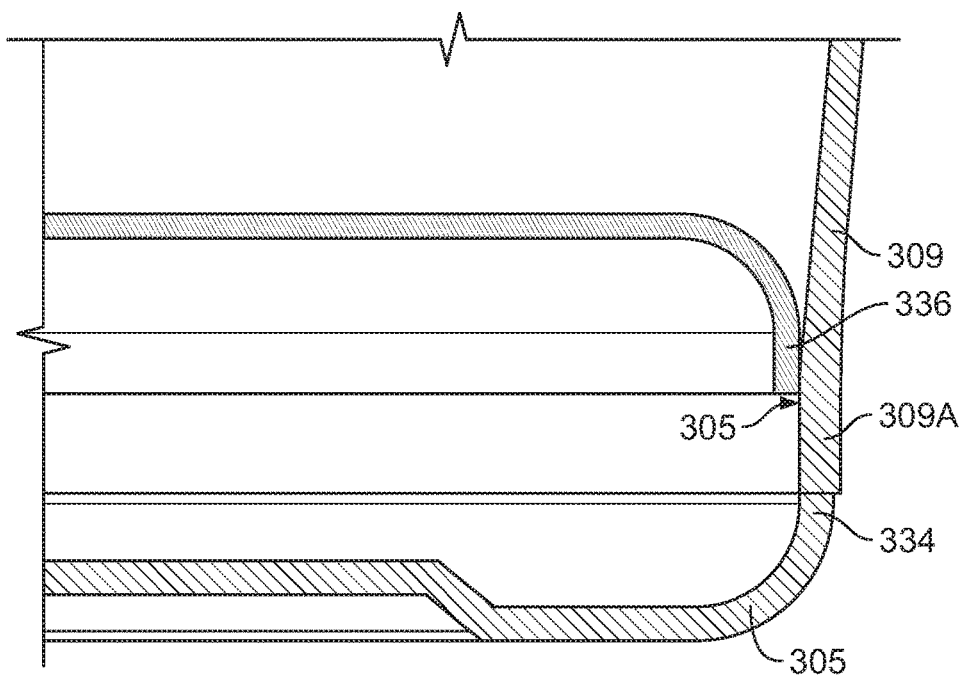
FIG. 10 depicts another partial and enlarged cross-sectional view of the example container of FIG. 8, according to one or more aspects described herein.

FIGS. 8-10 show another example container 300 having a similar construction and functionality as the examples discussed above in relation to FIGS. 5-7, where like reference numerals represent like features having similar functionality. The container 300 can be formed using similar techniques and materials as discussed in the above examples. However, in this example, instead of using a press-fit to first secure the end cap 305 to the bottom of the container, the end cap 305 can be held in place by only a weld, such as a laser weld, brazing process, arc weld, or a silver solder, to form the seam 334. Similar to the examples above, after the end cap 305 is welded into place, the seam 334 can be polished such that it is no longer noticeable to the user.

In this example, as shown in FIGS. 9 and 10, the sidewall 309 may provide a mounting surface for both the bottom section 328 of the second outer wall 308 and the end cap 305. The sidewall 309 can include a small vertical wall section 309A for receiving both the end cap 305 and the bottom section 328. In addition, like in the above example, the bottom section 328 of the second outer wall 308 may include an axially extending flange 336 for securing the bottom section 328 to the sidewall 309.

As shown in FIGS. 9 and 10, the bottom section 328 can be secured to an inner portion of the sidewall 309 on or near the small vertical wall section 309A by the axially extending flange 336 of the bottom section 328. This may be accomplished by any suitable method, e.g., such as laser welding, brazing processes, arc welding, or silver soldering. Once the bottom section 328 is secured to the sidewall 309, the container 300 can undergo the vacuumization process as discussed herein.

After the vacuumization process is completed, to cover up the dimple 316, the end cap 305 can be secured to the bottom of the sidewall 309 at the small vertical wall section 309A, again by any suitable method, such as a laser welding, brazing processes, arc welding, or silver soldering. In one specific example, the weld between the end cap and the sidewall can be a laser welded but joint. Moreover, laser welding the end cap 305 to the sidewall 309 can help to avoid any burn marks on the second outer wall 308 to give a better finish to the outside of the container 300 after the outside of the container 300 is polished. In alternative examples, the small vertical wall section 309A, the end cap 305 and seam 334 can match the profile of the second outer wall 308 to give the entire outside portion of the container a consistent and continuous profile. Additionally, the small vertical wall section 309A can be shortened as much as possible to give the outside portion of the container a consistent and continuous profile. Moreover, in alternative embodiments, where the container has vertical walls the vertical wall section 309A may not be required.

Figure 11:
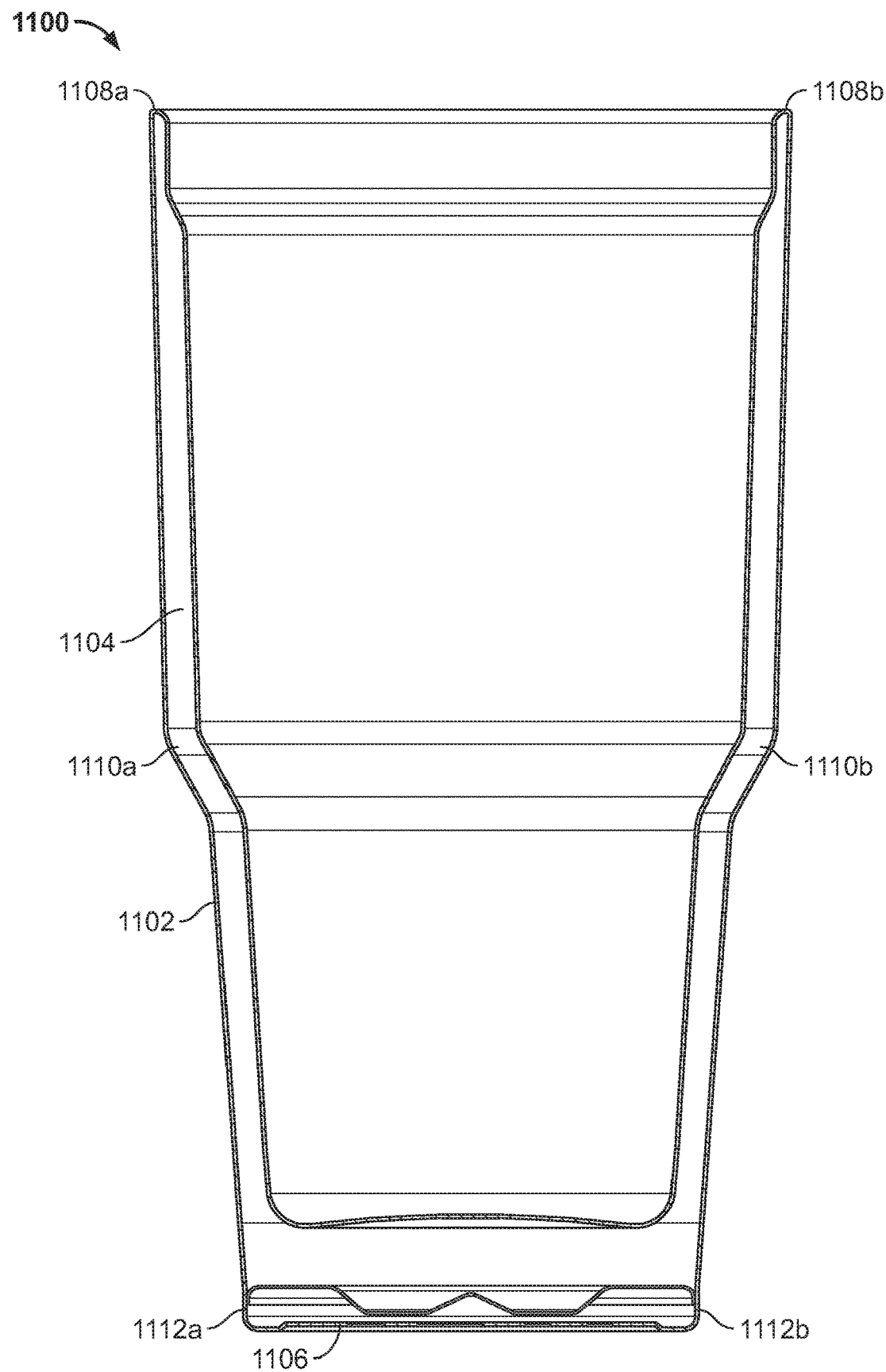
FIG. 11 depicts a cross-sectional view of another example container, according to one or more aspects described herein.

FIG. 11 schematically depicts a cross-sectional view of another example container 1100. In one implementation, container 1100 has geometrical features similar to container 300, and comprises an outer wall 1102, an inner wall 1104, and an end cap 1106. The container 1100 may be constructed from two or more materials configured to provide a combination of structural properties. A first material may be utilized to provide increased hardness at one or more areas or structural features of the container 1100 that are more likely to be subjected to impact forces during use of the container 1100 (e.g. areas or features of container 1100 likely to be impacted/struck by incidental dropping, during transport, or generally during daily use of the container 1100, among others). Additionally, container 1100 may utilize a second material to construct structural elements that will not be configured to resist external impact forces to the same extent as the first material, and the like. As such, the second material may comprise a comparatively softer material than the first material. The second material may have a comparatively lower density than the first material, which may be utilized to reduce an overall mass of the container 1100. The second material may also have comparatively increased malleability than the first material, such that the second material may be utilized for elements of the container 1100 subjected to increased stretching forces during one or more forming processes used to construct the container 1100. Also the first and second materials may comprise different thicknesses depending on the desired mechanical properties of the container. For example, the first material may be formed thinner than the second material, or the second material may be formed thinner than the first material. Forming one of the first or second materials thinner may help to provide an otherwise lighter weight container.

In one implementation, the outer wall 1102 and the end cap 1106 may be constructed from the first material having comparatively higher hardness (e.g. resistance to indentation) and/or strength (e.g. ultimate tensile strength or yield strength) than the second material. The second material may be utilized to construct the inner wall 1104, with the second material having comparatively lower hardness and/or strength properties than the first material. It is contemplated that this described methodology may be generalized and used with alternative container geometries than those of container 1100, such that the first material may be utilized to construct one or more elements benefiting from increased hardness and/or strength in order to resist indentation and/or deformation and fracture as a result of impacts to external surfaces of alternative container geometries, and the second material may be utilized to construct one or more elements of the alternative container geometries that are subject to comparatively higher stretching forces during one or more forming processes.

It is also contemplated that a container, such as container 1100, may utilize the first material, as described above, to construct the inner wall 1104. Additionally, the second material, as previously described, may be utilized to construct one or more of the outer wall 1102 and the end cap 1106. As such, the inner wall 1104 may comprise the comparatively harder first material and one or more of the outer wall 1102 and the end cap 1106 may comprise the comparatively softer second material, without departing from the scope of these disclosures. In this example, the first material, which can be a higher grade material, is used to construct the inner wall 1104. Because of the higher grade material, the inner wall 1104, in this case, can be formed thinner than the outer wall 1102 during the formation process. This may allow for the overall container 1100 to be formed lighter by way of reducing the thickness of the inner wall of the container.

In one example, container 1100 may be constructed from two different types of titanium. As such, the first material, as previously described, may comprise a titanium alloy, such as Grade 5 Titanium (Grade 5 as described by the ASTM standard for titanium), Ti6Al4V. Further, the second material, as previously described, may comprise a softer titanium, such as commercially pure Titanium (e.g. Grade 1, Grade 2, Grade 3, Grade 4, Grade 7, or Grade 11 titanium, as defined by the ASTM standard for titanium). However, it is contemplated that the first material and the second material, as previously described, may be two different grades of titanium, as defined by the ASTM standard for titanium, other than those described herein.

In an alternative implementation, the container 1100 may be constructed from two or more different metals or alloys. In one example, the outer wall 1102 and the end cap 1106 may be constructed from a titanium (e.g. Grade 5 titanium, Ti6Al4V, as defined by the ASTM standard for titanium), and the inner wall 1104 may be constructed from an aluminum alloy (e.g. 7068 aluminum, 7075 aluminum, 6061 aluminum, 6063 aluminum, 2024 aluminum, 5052 aluminum, or 7050 aluminum, among others). In this way, the outer wall 1102 and the end cap 1106 may be constructed from a comparatively stronger titanium alloy, and the inner wall 1104 may be can structure from a comparatively softer, but also a comparatively lighter, aluminum alloy. In this way, the combined strength of the titanium alloy on the outer wall 1102 and the end cap 1106 with the weight reduction of an aluminum alloy on the inner wall 1104 may result in the container 1100 having a combination of properties configured to resist indentation, deformation, and/or fracture on those external surfaces more likely to be subjected to incidental impact during use of the container 1100, and combined with weight reduction for those elements of the container 1100 that are less likely to be subjected to incidental impact forces during use. It is contemplated that additional or alternative metals or alloys may be utilized in addition to, or as alternatives to, the titanium and aluminum alloys described above. For example, the container 1100 may utilize one or more of stainless steels, copper, brass, or a magnesium alloy, among others.

In yet another example, the container 1100 may be constructed from one or more metals or alloys in combination with one or more polymers. As such, the outer wall 1102 and the end cap 1106 may be constructed from a titanium (e.g. Grade 5 titanium, Ti6Al4V, as defined by the ASTM standard for titanium), and the inner wall 1104 may be constructed from a polymer. In this way, the polymer used to construct the inner wall 1104 may reduce the weight of the container 1100 while the titanium alloy may provide comparatively higher hardness and/or strength for those surfaces more likely to be impacted during transport or use of the container 1100. It is contemplated that one or more polymers utilized to construct the inner wall 1104 may include, among others, Acrylonitrile Butadiene Styrene, polypropylene, polyethylene, polystyrene, polyvinyl chloride, nylon, polycarbonate or acrylic, or combinations thereof.

In certain examples, the outer wall 1102 and the inner wall 1104 of the container 1100 may be welded to one another (e.g. circumferentially welded at points 1108*a* and 1108*b*). Further, it is contemplated that any welding process may be utilized, including, among others, laser and arc welding. In certain examples, a filler metal may be used in order to weld the dissimilar materials. Similarly, the outer wall 1110 may be welded to the end cap 1106. However, additional or alternative coupling mechanisms are contemplated, without departing from the scope of these disclosures, including, among others, press fitting, adhesives, or mechanical fasteners (e.g. rivets, bolts, or staples, among others).

In one implementation, the container 1100 may be constructed from a single metal or alloy, and selected portions of, in one example, the outer wall 1102, may be hardened after the container 1100 is constructed using one or more heat treatment processes (e.g. tempering, precipitation hardening, or quenching). As such, in one example, the container 1100 may be constructed by coupling the outer wall 1102, the inner wall 1104, and the end cap 1106 to one another. Subsequently, one or more of the outer wall 1102 and the end cap 1106 may be subjected to localized heating in order to increase the strength of the structures using one or more of tempering, precipitation hardening, or quenching.

In another example, the container 1100 may be constructed from two or more materials such that edges/corners of the container 1100 are constructed using a harder material than the remainder of the insulating container 1100 in order to resist indentation within those areas more likely to be subjected to an external impact force. For example, corners 1110*a*-1110*b* and 1112*a*-1112*b* may be constructed from the first material, with those mechanical properties of the first material as previously described, and the remainder of the insulating container 1100 may be constructed from the second material, with those mechanical properties of the second material as previously described.

In one example, an insulating container formed of a material can include a first inner wall having a first end having an opening extending into an internal reservoir for receiving liquid, and a second outer wall forming an outer shell of the container. The second outer wall can include a second end configured to support the container on a surface. The second outer wall can include a dimple, and the dimple can include a circular base and an inner portion converging to an opening extending into the second outer wall. The opening can be sealed by a resin, and the circular base can be covered by disc formed of the same material as the container. The container can also include a sealed vacuum cavity forming an insulated double wall structure between the first inner wall and the second outer wall. The first inner wall can be constructed from a first material having a first hardness and the second outer wall can be constructed from a second material having a second hardness higher than the first hardness. The first material can have a first density and the second material can have a second density, higher than the first density.

The first material can be a first grade of titanium, such as Grade 2 Titanium, and the second material can be a second grade of titanium, such as Grade 5 Titanium. The first material can be a first type of steel, which can be a first type of stainless steel, and the second material can be a second type of steel, which can be a second type of stainless steel. The first material can be an aluminum alloy and the second material can be a titanium alloy. The first inner wall, the second outer wall, and the disc can be stainless steel or titanium.

The second outer wall can include a bottom surface, and the dimple can be located in the bottom surface. The bottom surface can define a center, and the dimple can be offset from the center and can resemble a dome, cone, or frustoconical shape. The disc can be flush with a surface of the second outer wall such that the disc and dimple are not visually apparent to a user. A weld can connect the disc to the second outer wall. Alternatively, the resin seals the disc to the second outer wall.

In another example, an insulating container can be formed of a material and can include a first inner wall having a first end having an opening extending into an internal reservoir for receiving liquid, and a second outer wall forming an outer shell of the container. The second outer wall can include a dimple, and the dimple can include a circular base and an inner portion converging to an opening extending into the second outer wall. The dimple can resemble a dome, conical, or frustoconical shape. The opening can be sealed by a resin. The container may also include a sealed vacuum cavity forming an insulated double wall structure between the first inner wall and the second outer wall. The second outer wall can include a bottom surface, and the dimple can be located in the bottom surface. The bottom surface can define a center, and the dimple can be located at the center.

A cap can cover the dimple, and a weld can connect the cap to the second outer wall, and the weld can be not apparent to the user. The cap can support the container on a surface, and the cap can receive a weight for damping sound when the container is placed on a surface. Also the second outer wall can have a first thickness, and the cap can have a second thickness and wherein the second thickness can be greater than the first thickness to dampen the sound when the insulating container is placed onto a surface.

A method of forming an insulating container can include one or more of forming a first inner wall of a material defining a first end of the container, the first end having an opening extending into an internal reservoir for receiving liquid, forming a second outer wall of the material into an outer shell for the container, the second outer wall defining a second end of the container configured to support the container on a surface, the second outer wall comprising a dimple, the dimple having a circular base and an inner portion converging to an opening extending through the second outer wall, and sealing the opening with a resin to form a sealed vacuum cavity to create an insulated double wall structure between the first inner wall and the second outer wall and securing a disc formed of the material over the circular base. The method can also include locating the dimple in a bottom surface of the outer wall. The bottom surface can define a center and the dimple can be located offset from the center. The method can also include forming the disc flush with a surface of the second outer wall, forming the disc and the dimple as not visually apparent to a user, and welding the disc to the second outer wall. In one example, the method can include laser welding the disc to the second outer wall. Alternatively, the method can include sealing the disc to the second outer wall with the resin seals. The dimple can be formed in a dome, cone, or frustoconical shape.

Another example method of forming a container may include one or more of: forming a first inner wall with a first end having an opening extending into an internal reservoir for receiving liquid, forming a second outer wall into an outer shell for the container, the second outer wall comprising a dimple, forming a dimple in the second outer wall and forming the dimple with a circular base and an inner portion converging to an opening extending through the second outer wall, sealing the opening with sealed a resin to form a sealed vacuum cavity as an insulated double wall structure between the first inner wall and the second outer wall, and providing a cap to cover the dimple, welding and polishing the weld the cap to the second outer wall, such that the weld is not apparent to the user. The method can also include one or more of configuring the cap to support the container on a surface, providing the cap with a weight for damping sound when the container is placed on a surface. The second outer wall can include a bottom surface and the dimple can be located on the bottom surface. The bottom surface can define a center and the dimple can be located at the center. The dimple can be formed into a dome, conical, or frustoconical shape.

An insulating container formed of a material that may have: a first outer wall forming an outer shell of the container, the first outer wall may have a first end configured to support the container on a surface, the first outer wall may have a dimple, the dimple may have a circular base and an inner portion converging to an opening extending into the first outer wall, the opening may be sealed by a resin and the circular base may be covered by disc formed of the material; a second inner wall may have a second end that may have an opening extending into an internal reservoir for receiving liquid; a sealed vacuum cavity forming an insulated double wall structure between the first outer wall and the second inner wall, with the first outer wall that may have a first material having a first hardness value and the second inner wall having a second material that may have a second hardness value, and with the first hardness value being different than the second hardness value.

The insulated container, such that the first material may have a first density and the second material may have a second density, and with the first density higher than the second density.

The insulated container, such that the first material may be Grade 5 Titanium and the second material may be Grade 2 Titanium.

The insulated container, such that the first material may be a titanium alloy and the second material may be an aluminum alloy.

The insulated container, such that the first material may be a titanium alloy and the second material may be a polymer.

The insulated container, such that the first outer wall may have a bottom portion and the dimple may be located in the bottom portion.

The insulated container, such that the bottom portion may define a center and the dimple may be offset from the center.

The insulated container, such that the disc may be flush with a surface of the first outer wall.

The insulated container, such that the disc and dimple not visually apparent to a user.

insulated container, such that a weld may connect the disc to the first outer wall.

The insulated container, such that a resin may seal the disc to the first outer wall.

The insulated container, such that the dimple may resemble a dome shape.

The insulated container, such that the first outer wall, the second inner wall, and the disc may be titanium.

The insulated container, such that the first outer wall, the second inner wall, and the disc may be stainless steel.

The insulated container, such that the first hardness value is higher than the second hardness value.

The insulated container, such that the first hardness value may be lower than the second hardness value.

The insulated container, such that the first outer wall may have a first thickness and the second inner wall may have a second thickness different than the first thickness.

The insulated container, such that with the first thickness may be greater than the second thickness.

The insulated container, such that the first thickness may be less than the second thickness.

An insulating container formed of a material that may have: a first outer wall forming an outer shell of the container, the first outer wall may have a dimple, the dimple may have a circular base and an inner portion converging to an opening extending into the first outer wall, the opening may be sealed by a resin; a second inner wall may have a first end having an opening extending into an internal reservoir for receiving liquid; a sealed vacuum cavity may form an insulated double wall structure between the first outer wall and the second inner wall; and a cap covering the dimple and a weld connecting the cap to the first outer wall, with the weld is not apparent to a user, with the first outer wall having a first material having a first hardness value and the second inner wall has a second material having a second hardness value different from the first hardness value.

The insulating container, such that the first hardness value may be higher than the second hardness value.

The insulating container, such that the first hardness value may be lower than the second hardness value.

The insulating container, such that the first material may have a first density and the second material may have a second density, and with the first density higher than the second density.

The insulating container, such that the first material may have a first density and the second material may have a second density, and with the first density is lower than the second density.

The insulating container, such that the first material may be Grade 5 Titanium and the second material may be Grade 2 Titanium.

The insulating container, such that the first material may be a titanium alloy and the second material may be an aluminum alloy.

The insulating container, such that the first material may be a titanium alloy and the second material may be a polymer.

The insulating container, such that the cap may support the container on a surface.

The insulating container, such that the cap may receive a weight for damping sound when the container is placed on a surface.

The insulating container, such that the second outer wall may have a bottom surface and with the dimple may be located in the bottom surface.

The insulating container, such that the bottom surface may define a center and the dimple may be located at the center.

The insulating container, such that the dimple may resemble a dome shape.

The insulating container, such that the second outer wall may have a first thickness and the cap may have a second thickness and the second thickness may be greater than the first thickness to dampen sound when the insulating container is placed onto a surface.

The insulated container, such that the first outer wall may have a first thickness and the second inner wall may have a second thickness different than the first thickness.

The insulated container, such that the first thickness may be greater than the second thickness.

The insulated container, such that the first thickness may be less than the second thickness.

A method of forming an insulating container that may include: forming a first outer wall of a first material into an outer shell for the container, the first outer wall defining a first end of the container configured to support the container on a surface, the first outer wall having a dimple, the dimple having a circular base and an inner portion converging to an opening extending through the first outer wall, forming a second inner wall of a first material defining a second end of the container, the second end having an opening extending into an internal reservoir for receiving liquid; sealing the opening with a resin to form a sealed vacuum cavity to create an insulated double wall structure between the first outer wall and the second inner wall and securing a disc formed of the material over the circular base, with the first material has a first hardness value and the second material has a second hardness value.

The method, such that the first hardness value may be lower than the second hardness value.

The method, such that the first hardness value may be higher than the second hardness value.

The method, such that the first material may have a first density and the second material may have a second density, and the first density may be higher than the second density.

The method, such that the first material may have a first density and the second material may have a second density, and with the first density being lower than the second density.

The method, such that the first material is Grade 5 Titanium and the second material is Grade 2 Titanium.

The method, such that the first material is a titanium alloy and the second material is an aluminum alloy.

The method, such that the first material is a titanium alloy and the second material is a polymer.

The method, having a location of the dimple on a bottom surface of the outer wall.

The method, such that the bottom surface defines a center, and locating the dimple offset from the center.

The method, such that the disc may be flush with a surface of the second outer wall.

The method, such that the disc and the dimple may not be visually apparent to a user.

The method, such that the disc may be welded to the first outer wall.

The method, such that the disc may be laser welded to the first outer wall.

The method, such that the disc may be sealed to the first outer wall with the resin seals.

The method, such that the dimple may be formed in a dome shape.

A method of forming a container that may include: forming a first outer wall from a first material into an outer shell for the container, the first outer wall having a dimple, forming a dimple in the first outer wall and forming the dimple with a circular base and an inner portion converging to an opening extending through the first outer wall; forming a second inner wall from a second material with a first end having an opening extending into an internal reservoir for receiving liquid; sealing the opening with a resin to form a sealed vacuum cavity as an insulated double wall structure between the first outer wall and the second inner wall; providing a cap to cover the dimple, welding and polishing the weld the cap to the first outer wall, such that the weld is not apparent to the user, with the first material has a first hardness value and the second material has a second hardness value, and with the first hardness value is higher than the second hardness value.

The method, such that the first material may have a first density and the second material may have a second density, and the first density may be higher than the second density.

The method, such that the first material may be a Grade 5 Titanium and the second material may be a Grade 2 Titanium.

The method, such that the first material may be a titanium alloy and the second material may be an aluminum alloy.

The method, such that the first material may be a titanium alloy and the second material may be a polymer.

The method, such that the cap may support the container on a surface.

The method, which may further have a cap with a weight for damping sound when the container is placed on a surface.

The method, such that the first outer wall may have a bottom surface and locating the dimple on the bottom surface.

The method, such that the bottom surface defines a center, and the dimple is located at the center.

The method, such that the dimple is formed into a dome shape.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

What is claimed is:

1. An insulating container formed of a material comprising:
    an inner wall having a first end having an opening extending into an internal reservoir for receiving liquid;
    an outer wall forming an outer shell of the insulating container, the outer wall having first end configured to support the insulating container on a surface, a vertical wall section, a bottom portion, and a dimple, the dimple having a circular base and an inner portion converging to an opening, the opening being sealed by a resin;
    a sealed vacuum cavity forming an insulated double wall structure between the inner wall and the outer wall; and
    a cap covering the dimple and the opening and a weld connecting the cap to the outer wall,
    wherein the vertical wall section defines an inner surface for receiving the bottom portion and comprises a bottom-most surface, wherein the weld is formed between the cap and the bottom-most surface,
    wherein the inner wall comprises a first material having a first hardness value and the outer wall comprises a second material having a second hardness value, and
    wherein the first hardness value is different than the second hardness value, wherein the first material comprises a first density and the second material comprises a second density, and wherein the first density is lower than the second density, wherein the first material comprises an aluminum alloy or polymer and the second material comprises a titanium alloy.

2. The insulated container of claim 1 wherein the dimple is located in the bottom portion.

3. The insulated container of claim 2 wherein the bottom portion defines a center and the dimple is offset from the center.

4. The insulated container of claim 1 wherein the cap is flush with a surface of the outer wall.

5. The insulated container of claim 1 wherein the weld and dimple are not visually apparent to a user.

6. An insulating container formed of a material comprising:
    an inner wall having a first end having an opening extending into an internal reservoir for receiving liquid;
    an outer wall forming an outer shell of the insulating container, the outer wall comprising a vertical wall section, a bottom portion, and a dimple;
    a sealed vacuum cavity forming an insulated double wall structure between the inner wall and the outer wall; and
    a cap covering the dimple and a weld connecting the cap to the outer wall, wherein the weld is not apparent to a user,
    wherein the vertical wall section defines an inner surface for receiving the bottom portion and comprises a bottom-most surface, wherein the weld is formed between the cap and the bottom-most surface,
    wherein the inner wall comprises a first material having a first hardness value and the outer wall comprises a second material having a second hardness value different from the first hardness value,
    wherein the outer wall has a first thickness and the cap has a second thickness and wherein the second thickness is greater than the first thickness to dampen sound when the insulating container is placed onto a surface,
    wherein the first material comprises an aluminum alloy or polymer and the second material comprises a titanium alloy.

7. The insulating container of claim 6, wherein the first hardness value is lower than the second hardness value.

8. The insulating container of claim 6, wherein the first material comprises a first density and the second material comprises a second density, and wherein the first density is lower than the second density.

9. The insulating container of claim 6, wherein the cap supports the insulating container on a surface.

* * * * *